US012652081B2

(12) United States Patent
Jamadagni et al.

(10) Patent No.: US 12,652,081 B2
(45) Date of Patent: Jun. 9, 2026

(54) SYSTEM AND METHOD FOR IMPLEMENTING INTELLIGENT REFLECTING SURFACES (IRS) IN NETWORKS

(71) Applicant: JIO PLATFORMS LIMITED, Ahmedabad (IN)

(72) Inventors: Satish Nanjunda Swamy Jamadagni, Bangalore (IN); Mahesh Nayaka Mysore Annaiah, Bangalore (IN); Mathew Oommen, Mumbai (IN); Pradeep Krishnamurthy Hirisave, Bangalore South (IN); Vinay Shrivastava, Bangalore (IN); Surabhi Karandikar, Nagpur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 60 days.

(21) Appl. No.: 18/247,463

(22) PCT Filed: Mar. 24, 2023

(86) PCT No.: PCT/IB2023/052937
§ 371 (c)(1),
(2) Date: Mar. 31, 2023

(87) PCT Pub. No.: WO2023/187583
PCT Pub. Date: Oct. 5, 2023

(65) Prior Publication Data
US 2024/0380440 A1      Nov. 14, 2024

(30) Foreign Application Priority Data

Mar. 31, 2022     (IN) .............................. 202221019791

(51) Int. Cl.
*H04B 7/04*               (2017.01)

(52) U.S. Cl.
CPC ................................ *H04B 7/04026* (2023.05)

(58) Field of Classification Search
CPC  H04B 7/04026; H04B 7/024; H04B 7/15528; H04B 7/06952; H04B 7/0456;
(Continued)

(56) References Cited

U.S. PATENT DOCUMENTS 11,515,928 B2 * 11/2022 Choi ...................... H04B 7/043
11,777,206 B2 * 10/2023 Zhu .......................... H01Q 3/38
                                                              375/267
(Continued)

FOREIGN PATENT DOCUMENTS

WO          2021236510 A1     11/2021
WO          2022007417          1/2022

OTHER PUBLICATIONS

International Search Report issued by the International Searching Authority issued in related Foreign Application No. PCT/IB2023/052937, mailed Jul. 27, 2023 (2 pgs.).
(Continued)

*Primary Examiner* — Kenneth T Lam
(74) *Attorney, Agent, or Firm* — FINNEGAN, HENDERSON, FARABOW, GARRETT & DUNNER LLP

(57)          ABSTRACT

Embodiments of a sixth generation (6G) network device in communication with one or more Intelligent Reflecting Surface (IRSs) and one or more UEs are disclosed. In an embodiment, the 6G network device includes one or more processors coupled to a memory storing a set of instructions which when executed by the one or more processors cause the network device to compute IRS tilt information associated with the one or more IRSs based at least in part on one or more of signal-to-noise-plus-interference ratio (SINR) information, Reference Signal Received Power (RSRP)
(Continued)

information, and Reference Signal Received Quality (RSRQ) information received from the one or more UEs. The one or more processors further cause the network device to communicate the computed IRS tilt information to the one or more IRSs via a network interface, wherein the IRS tilt information is used to control one or more operational aspects of the one or more IRSs.

17 Claims, 14 Drawing Sheets

(58) Field of Classification Search
    CPC H04B 7/04013; H04B 7/0617; H04B 7/0632; H04B 17/328; H04B 17/336; H01Q 3/46; H01Q 15/148; H01Q 15/0006
    See application file for complete search history.

(56) References Cited

U.S. PATENT DOCUMENTS

| | | | |
|---|---|---|---|
| 2021/0126359 A1* | 4/2021 | Kim | H04B 7/145 |
| 2022/0077919 A1* | 3/2022 | Li | H04B 7/04 |
| 2023/0261706 A1* | 8/2023 | Raghavan | H04B 7/0469 |
| | | | 455/501 |
| 2023/0421209 A1* | 12/2023 | Jiang | H04W 24/02 |
| 2025/0016812 A1* | 1/2025 | Zhang | H04W 72/54 |

OTHER PUBLICATIONS

Wu, Qingqing, et al.; "Intelligent Reflecting Surface-Aided Wireless Communications: A Tutorial," IEEE Transactions On Communications, vol. 69, No. 5, May 2021 (39 pgs.).
European Search Opinion issued for counterpart application EP23778608 issued Sep. 25, 2025.

* cited by examiner

200

202

204

102

206

ENERGY
TRANSFER

INFORMATION
TRANSFER

102

208

DESIRED SIGNALS

102

OVERHEARING
SIGNALS

LEGITIMATE USER

EAVESDROPPER

210

DATA OFFLOADING

212

102

400

COPPER BACKPALNE

CONTROL CIRCUIT BOARD

IRS 404

BASE STATION 402

MICROCONTROLLER 406

700

706

708

710

712

716

SYSTEM AND METHOD FOR IMPLEMENTING INTELLIGENT REFLECTING SURFACES (IRS) IN NETWORKS

RESERVATION OF RIGHTS

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. Further, the patent document also proposes new network interface protocols that will contribute to the 3GPP Technical Specification (TS) for future generation network technologies (6G networks).

FIELD OF INVENTION

The present invention relates generally to IRS network architectures, and more particularly to IRS network architectures in communication networks.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Existing communication technologies (e.g., 5G) and future technologies (e.g., 6G) face two main practical limitations. Firstly, there exists a lack of control over the wireless channel, and secondly, there is a high-power consumption of the wireless interface with respect to the networks. To address the need for green and sustainable future cellular networks, the concept of reconfiguring wireless propagation environments using Intelligent Reflecting Surfaces (IRS) or RIS (Reconfigurable Intelligent Surfaces) has emerged in the last few years. A typical IRS architecture comprises of many low-cost passive antennas that can smartly reflect the impinging electromagnetic waves for performance enhancement.

The 5G wireless technology that is being developed in 3GPP is meant to deliver higher multi-Gbps peak data speeds, ultra-low latency, more reliability, massive network capacity, increased availability, and a more uniform user experience to more users. Higher performance and improved efficiency empower new user experiences and connects newer industries. Some of the above-mentioned objectives have been met but there are still quite a few issues that needs to be resolved in the existing 5G networks. For example, existing 5G networks may not optimally accommodate multiple industry verticals, may not provide architectures to support private networks and support flexible network deployments.

Reconfigurable Intelligent Surfaces (RIS) are fast emerging as a key wireless technology trend for 5G networks and also beyond 5G networks. RIS correspond to smart radio surfaces of many small antennas or reconfigurable metamaterial elements ("unit cells"), which enable the controlling of propagation environment through tuneable scatterings of electromagnetic waves. These intelligent surfaces have reflection, refraction, and absorption properties, which are reconfigurable and adaptable to the radio channel environment.

Further, the existing 5G networks still do not use many of the available or emerging technologies in an optimal manner to solve many of the above-mentioned problems. Examples of such available technologies include artificial intelligence, terahertz communications, optical wireless technology, free space optic network, blockchain, three-dimensional networking, quantum communications, unmanned aerial vehicle, cell-free communications, integration of wireless information and energy transfer, integration of sensing and communication, integration of access-backhaul networks, dynamic network slicing, holographic beamforming, and big data analytics.

Further, with reference to 6G networks, existing systems and methods do not provide for any 6G network interface architecture and any protocol between the 6G network and the IRS that satisfactorily addresses the concerns as highlighted above with reference to current 5G networks.

There is, therefore, a requirement in the art for a system and a method for providing an IRS architecture for 5G networks and beyond networks (6G networks) that can overcome the aforementioned problems in the art and can utilize the convergence of at least one or more of the above-mentioned available technologies.

OBJECTS OF THE PRESENT DISCLOSURE

Some of the objects of the present disclosure, which at least one embodiment herein satisfies are as listed herein below.

It is an object of the present disclosure to facilitate an effective, concurrent, and improved communication between a base station (BS) in 5G/6G networks and one or more UEs.

It is an object of the present disclosure to eliminate the need for additional and expensive deployment of BS for better network coverage in 6G and further networks.

It is an object of the present disclosure to facilitate an economical and next generation-based system and a method that can enable a communication interface or network interface between BS and IRS in 6G and further networks.

It is an object of the present disclosure to facilitate a system and a method that can enable control of IRS by the BS using a communication or network interface in 6G and further networks.

SUMMARY OF THE INVENTION

Some of the objects of the present disclosure, which at least one embodiment herein satisfies are as listed herein below. Embodiments of a network device in communication with one or more Intelligent Reflecting Surface (IRSs) and one or more UEs are disclosed. In an embodiment, the 6G network device includes one or more processors coupled to a memory storing a set of instructions which when executed by the one or more processors cause the network device to compute IRS tilt information associated with the one or more IRSs based at least in part on a first set of information. In an embodiment, the first set of information comprises one or more of signal-to-noise-plus-interference ratio (SINR) information, Reference Signal Received Power (RSRP)

information, and Reference Signal Received Quality (RSRQ) information received from the one or more UEs. The one or more processors further cause the network device to communicate the computed IRS tilt information to the one or more IRSs via a network interface, wherein the IRS tilt information is used to control one or more operational aspects of the one or more IRSs.

In an embodiment, the one or more processors further cause the network device to compute the IRS tilt information based on one or more of location of the one or more IRSs, location of the one or more UEs, and channel quality indicator (CQI) information from the one or more UEs, wherein the IRS tilt information is indicative of beam forming for the one or more IRSs. In an embodiment, the one or more processors further cause the network device to compute the IRS tilt information as a precoding matrix or a beam forming or an IRS tilt matrix that is used to transmit one or multiple spatially directive signals simultaneously from each of the one or more IRSs, wherein each of the one or more IRSs comprises of a plurality of antennas. In an embodiment, every antenna of the one or more IRS transmit array is configured to emit a different signal, designed in digital domain based on the respective IRS tilt information. In an embodiment, the one or more IRSs apply the precoding matrix or the beam forming matrix provided by the network device to provide directivity towards an intended UE of the one or more UEs and choose a corresponding transmit power.

In an embodiment, the one or more IRSs uses the IRS tilt information to compute a digital tilt and a mechanical tilt for each of the antennas and to allocate power and phases to each of the antennas. In an embodiment, the one or more processors further cause the network device to be aware of the one or more IRSs either through prior knowledge encoded in a database or via a signalling mechanism established between the one or more IRSs and the network device via the network interface. In an embodiment, the one or more processors further cause the network device to receive a handshake signal from a new IRS when activated via a physical connection between the new IRS and the network device during a setup process.

In an embodiment, the one or more processors further cause the network device to create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details. In an embodiment, the network interface implements a network interface protocol that is established between the network device and the one or more IRSs, wherein the network interface protocol includes a handshake signal schema. In an embodiment, the network interface is established through a direct connection between the network device and the one or more IRSs via a micro controller. In an embodiment, the one or more processors further cause the network device to compute the IRS tilt information necessary to achieve a SINR objective based on one or more of a user distribution, user profiles, SINR profiles, and Block Error Rate (BLER) profiles for a given region serviced by the network device. In an embodiment, the one or more processors further cause the network device to send one or more control messages to the one or more IRSs at a pre-configured periodicity, wherein the one or more IRSs are controlled by the network device using the one or more control messages.

Embodiments of a method implemented in a network device in communication with one or more Intelligent Reflecting Surface (IRSs) and one or more Ues are disclosed. In an embodiment, the method includes computing IRS tilt information associated with the one or more IRSs based at least in part on a first set of information. In an embodiment, the first set of information comprises one or more of signal-to-noise-plus-interference ratio (SINR) information, Reference Signal Received Power (RSRP) information, and Reference Signal Received Quality (RSRQ) information received from the one or more UEs. The method further includes communicating the computed IRS tilt information to the one or more IRSs via a network interface, wherein the IRS tilt information is used to control one or more operational aspects of the one or more IRSs.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
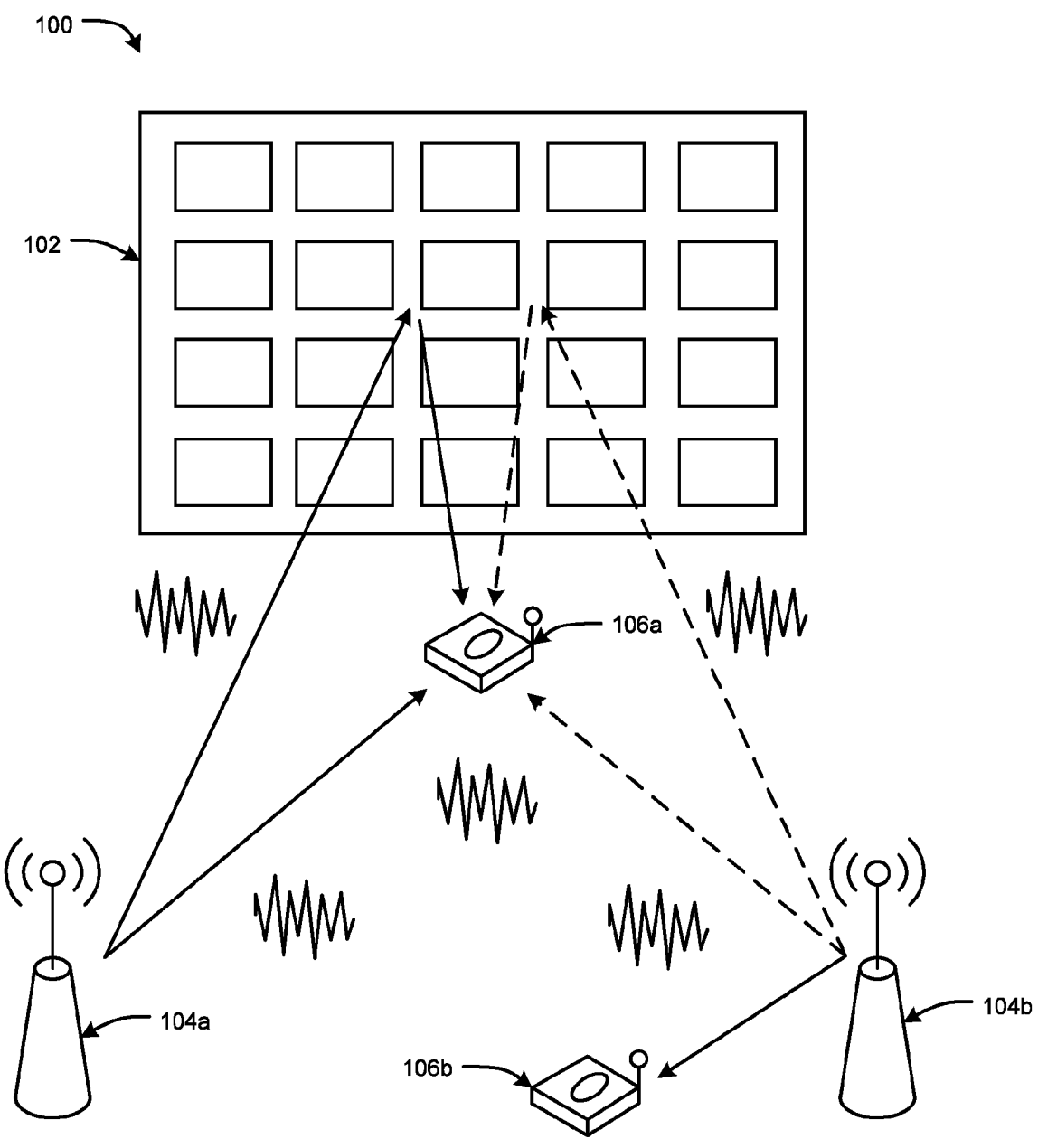
FIG. 1 illustrates a typical IRS deployment scenario in an exemplary 5G or 6G network architecture, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A new paradigm of wireless communication, the sixth-generation (6G) system, with the full support of artificial intelligence is expected to be deployed in the next few years. In 6G networks, some fundamental issues, which may need to be addressed include higher system capacity, higher data rate, lower latency, and improved quality of service (QOS) compared to 5G networks.

Even in the current fifth generation (5G) technologies, higher system capacity, higher data rate, lower latency, and improved quality of service (QOS) are desirable. The 5G networks still do not use the available or emerging technologies.

Further, it may be desirable that the future networks such as 6G network are designed to achieve an expansion of human experience across physical, biological, and digital worlds. At the same time, it may be desirable for the 6G networks to enable next-generation industrial operations environment beyond Industry 4.0 ($4^{th}$ Industrial revolution) in various dimensions of performance. Such dimensions may include such as but not limited to positioning, sensing, ultra-reliability, energy efficiency and extreme real-time. 6G networks may provide novel radio and access architectures for both communications and sensing purposes, AI optimized wide area network (WAN) and data centre co-design, as well as dynamic orchestration of personalized services to revolutionize the long tail of niche consumer interests.

While demand for mobile broadband will continue to increase for consumers and enterprise alike, uptake of ultra-reliable and low latency will be largely driven by specialized and local use cases in conjunction with non-public networks, and often with augmented intelligence. This will happen as integral part of automated and secure network transformation that is anticipated and being attempted in the current 5G networks. Objects ranging from cars, industrial machines, and appliances to watches and apparel will learn and organize themselves to fulfil human needs by automatically adapting to human behaviour, environment, and business processes. Energy efficiency is yet another key design criterion for the design of 6G network architectures, since performance of the network will depend on the energy available in the respective architectural domains.

One of the most challenging requirements comes from remote control in conjunction with augmented reality and immersive media experience. In addition to extreme ultra-reliable low latency (URLLC) performance requirement, this would demand ultra-high rates of 100 Gbit/s or higher allowing uncompressed transmission of high quality 360-degree video. Such a demand will necessitate a degree of flexibility and specialization beyond 5G network capabilities. 6G networks must, therefore, be intent and open service driven and, in short, business needs will drive 6G product and service creation. Product and service creation will be an integral part of the automated e2e service workflow that is steered and guided by policy and intent. In other words, use case driven means to meet the diverse needs and preferences of each user or specialized 6G sub-network, whether human, physical machine, or digital twin. In summary, the key requirements for 6G architecture may include: (a) network programmability; (b) deployment flexibility; (c) simplicity and efficiency; (d) security, robustness, and reliability; and (c) automation.

Embodiments of a network device (e.g., 6G network device) in communication with one or more Intelligent Reflecting Surface (IRSs) and one or more UEs are disclosed. In an embodiment, the network device includes one or more processors coupled to a memory storing a set of instructions which when executed by the one or more processors cause the network device to compute IRS tilt information associated with the one or more IRSs based at least in part on a first set of information. The first set of information comprises one or more of signal-to-noise-plus-interference ratio (SINR) information, Reference Signal Received Power (RSRP) information, and Reference Signal Received Quality (RSRQ) information received from the one or more UEs. The one or more processors further cause the network device to communicate the computed IRS tilt information to the one or more IRSs via a network interface, wherein the IRS tilt information is used to control one or more operational aspects of the one or more IRSs. In an embodiment, the one or more operational aspects of the one or more IRSs include mechanical aspects such as but not limited to mechanical tilt. In an embodiment, the one or more operational aspects of the one or more IRSs include digital aspects such as a digital tilt. In an embodiment, the one or more operational aspects of the one or more IRSs include electrical aspects such as but not limited to transmission power. It may be appreciated that each of the one or more IRSs include a plurality of tiles or panels. In an exemplary embodiment, the disclosed operational aspects of the one or more IRSs can be controlled at various levels of granularity, for example, at a tile level, at a panel level, and so on.

In an embodiment, the one or more processors further cause the network device to compute the IRS tilt information based on one or more of location of the one or more IRSs, location of the one or more UEs, and channel quality indicator (CQI) information from the one or more UEs, wherein the IRS tilt information is indicative of beam forming for the one or more IRSs. In an embodiment, the one or more processors further cause the network device to compute the IRS tilt information as a precoding matrix or a beam forming or an IRS tilt matrix that is used to transmit one or multiple spatially directive signals simultaneously from each of the one or more IRSs, wherein each of the one or more IRSs comprises of a plurality of antennas. In an embodiment, every antenna of the one or more IRS transmit array is configured to emit a different signal, designed in digital domain based on the respective IRS tilt information. In an embodiment, the one or more IRSs apply the precoding matrix or the beam forming matrix provided by the network device to provide directivity towards an intended UE of the one or more UEs and choose a corresponding transmit power.

In an embodiment, the one or more IRSs uses the IRS tilt information to compute a digital tilt and a mechanical tilt for each of the antennas and to allocate power and phases to each of the antennas. In an embodiment, the one or more processors further cause the network device to be aware of the one or more IRSs either through prior knowledge encoded in a database or via a signalling mechanism established between the one or more IRSs and the network device via the network interface. In an embodiment, the one or more processors further cause the network device to receive a handshake signal from a new IRS when activated via a physical connection between the new IRS and the network device during a setup process.

In an embodiment, the one or more processors further cause the network device to create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details. In an embodiment, the network interface implements a network interface protocol that is established between the network device and the one or more IRSs, wherein the network interface protocol includes a handshake signal schema. In an embodiment, the network interface is established through a direct connection between the network device and the one or more IRSs via a micro controller. In an embodiment, the one or more processors further cause the network device to compute the IRS tilt information necessary to achieve a SINR objective based on one or more of a user distribution, user profiles, SINR profiles, and Block Error Rate (BLER) profiles for a given region serviced by the network device. In an embodiment, the one or more processors further cause the network device to send one or more control messages to the one or more IRSs at a pre-configured periodicity, wherein the one or more IRSs are controlled by the network device using the one or more control messages.

Embodiments of a method implemented in a network device in communication with one or more Intelligent Reflecting Surface (IRSs) and one or more UEs are disclosed. In an embodiment, the method includes computing IRS tilt information associated with the one or more IRSs based at least in part on a first set of information. In an embodiment, the first set of information comprises one or more of signal-to-noise-plus-interference ratio (SINR) information, Reference Signal Received Power (RSRP) information, and Reference Signal Received Quality (RSRQ) information received from the one or more UEs. The method further includes communicating the computed IRS tilt information to the one or more IRSs via a network interface, wherein the IRS tilt information is used to control one or more operational aspects of the one or more IRSs.

In an aspect of the disclosure, the described sixth generation (6G) network architecture addresses the issue of network flexibility as proposed herein after. This disclosure also proposes 5G and 6G network architectures that accommodate network sensing as a built-in functionality. The present disclosure also proposes an IRS architecture for 5G and beyond 5G networks (e.g., 6G) that solves, at least partially, the issue of utilizing and converging at least one of the above-mentioned existing technologies.

FIG. 1 illustrates a typical IRS deployment scenario 100 in an exemplary 5G or 6G network architecture, in accordance with an embodiment of the present disclosure. In an embodiment, the main peculiarities of RIS include: no power amplification; operation at the RF level with no or limited digital signal processing; and multi-functional reconfigurability. The disclosed embodiments of IRS architecture take into consideration these peculiarities and provides solutions to at least the problems highlighted above.

Figure 2A:
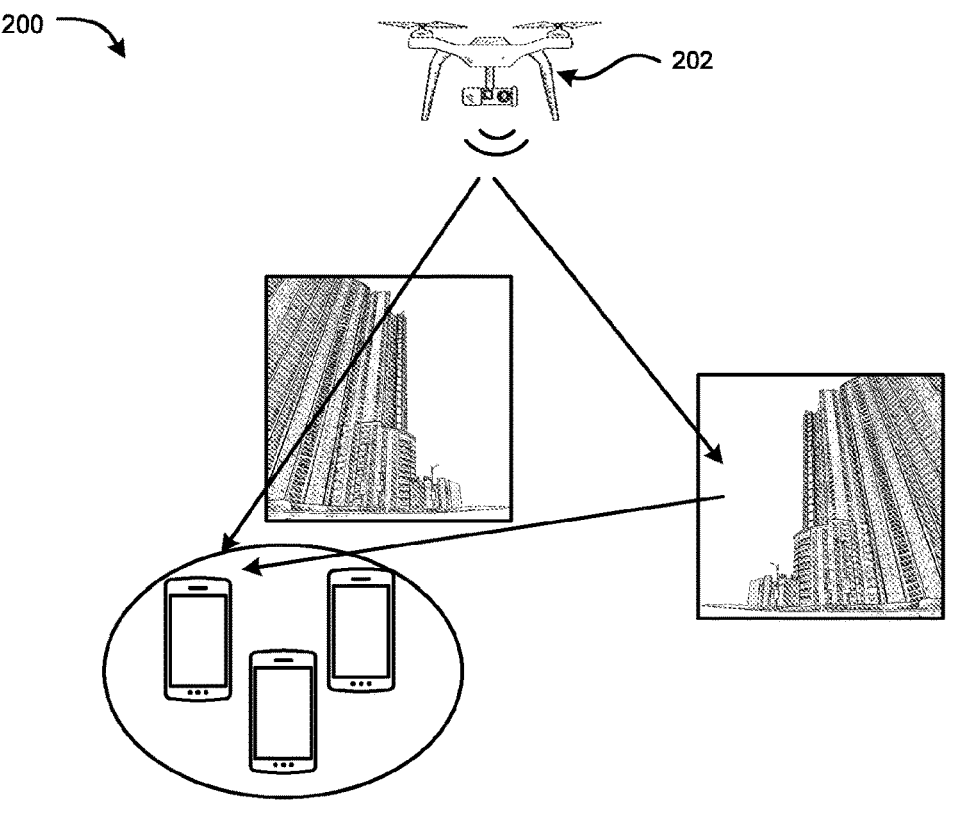
FIGS. 2a-2f illustrate exemplary use cases of IRS deployment, in accordance with an embodiment of the present disclosure.
Figure 2B:
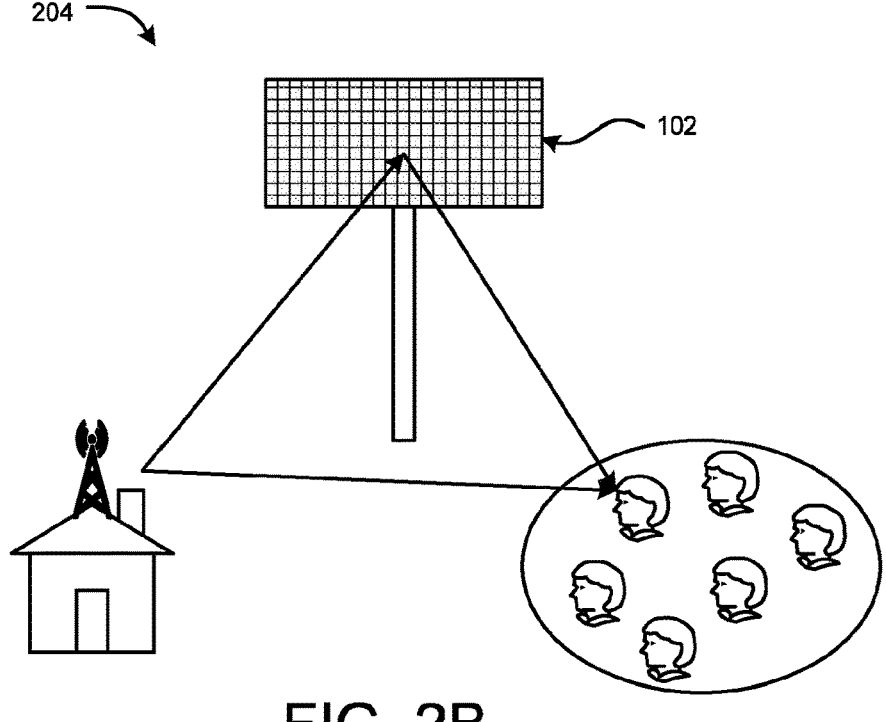
Figure 2C:
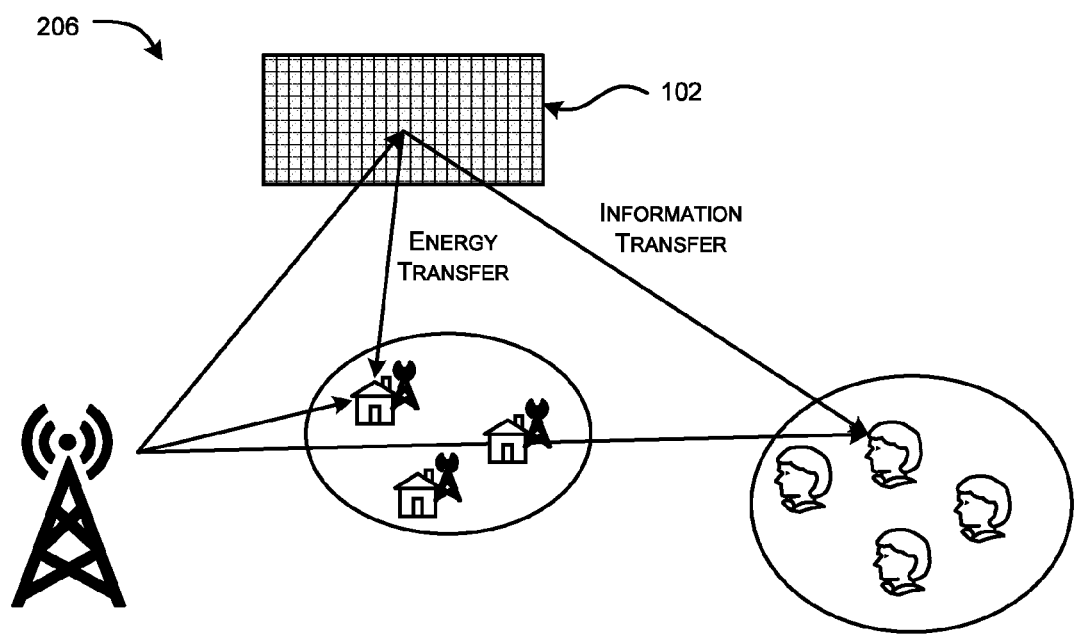
Figure 2D:
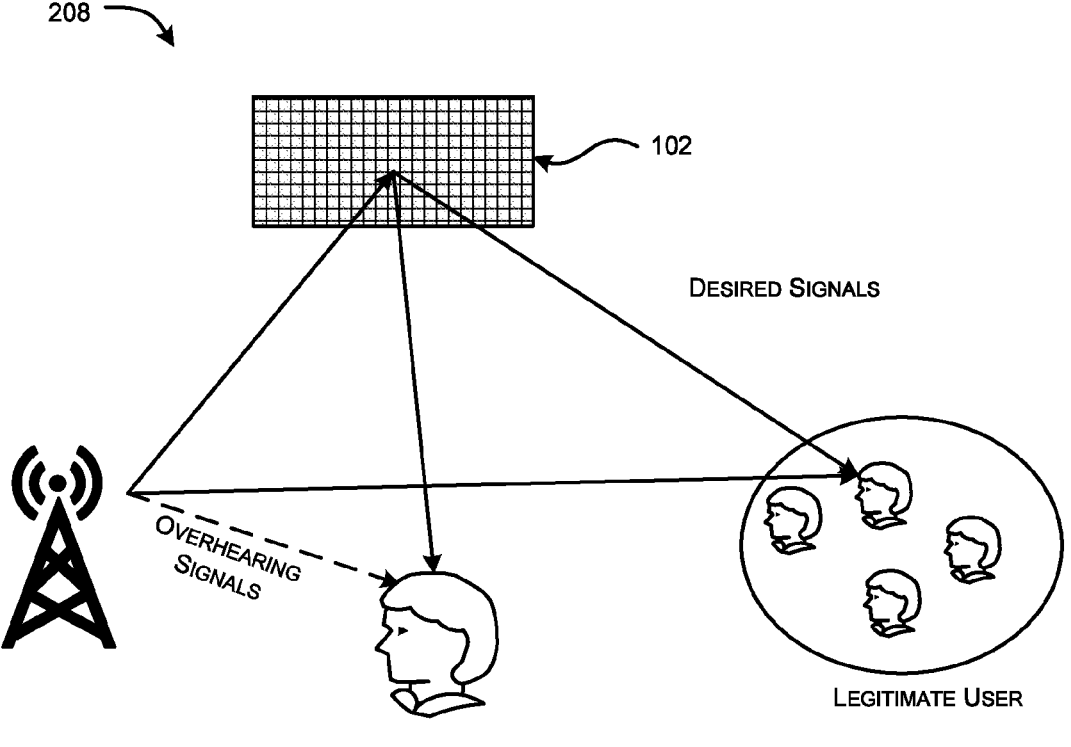
Figure 2E:
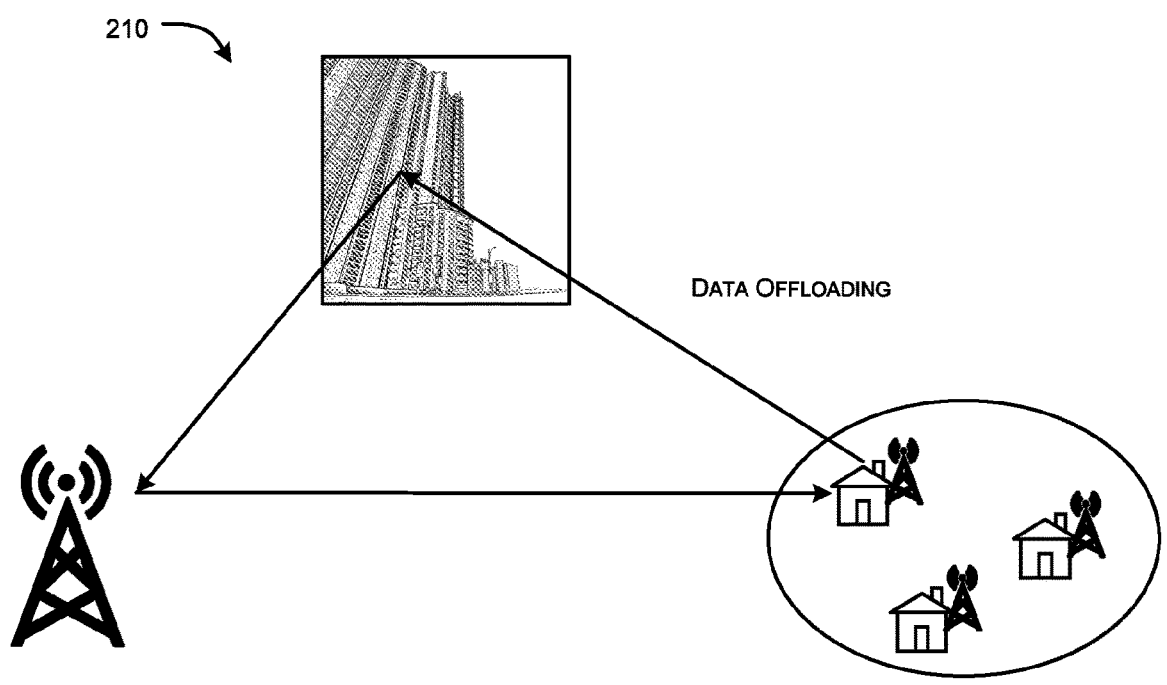
Figure 2F:
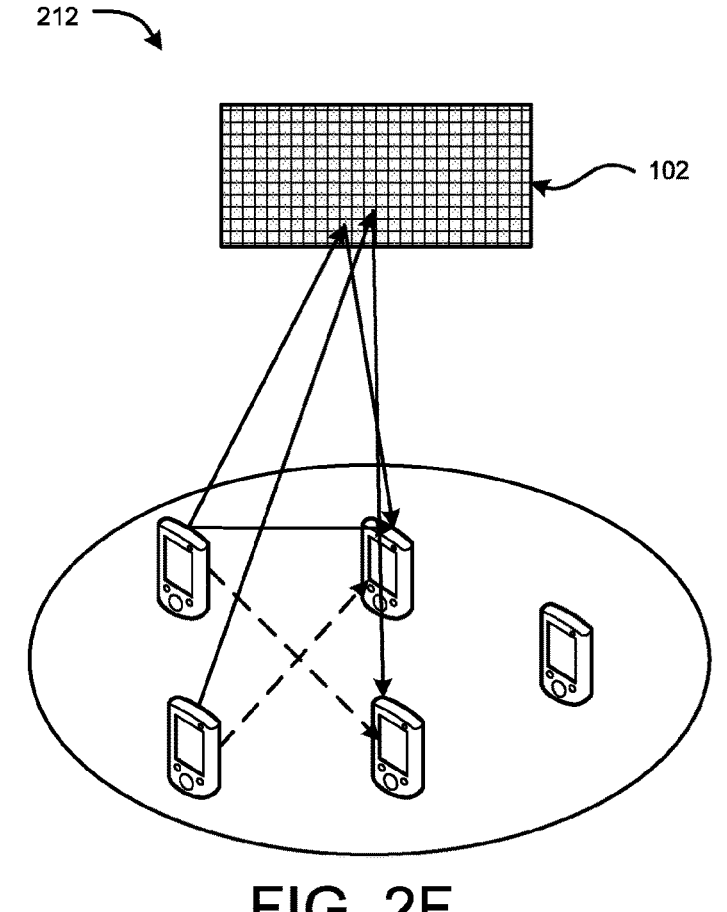

FIGS. 2a-2f illustrate exemplary use cases of IRS deployment, in accordance with an embodiment of the present disclosure. In general, the use cases that are currently being explored for RIS include-use as smart nearly passive relays for coverage extension, use as single-RF multi-stream transmitter for capacity improvements, and use for information aided transmission in the context of ambient backscattering and symbiotic radio. For example, as shown in FIG. 2*a*, IRS deployment 200 is used in RIS-assisted Unmanned Arial Vehicle (UAV) 202. In yet another example, as shown in FIG. 2*b*, IRS deployment 204 is used for RIS-assisted mm Wave communication. In yet another example, as shown in FIG. 2*c*. IRS deployment 206 is used for RIS-assisted simultaneous wireless information and power transfer (SWIPT). In yet another example, as shown in FIG. 2*d*, IRS deployment 208 is used for RIS-assisted physical layer security. In yet another example, as shown in FIG. 2*e*, IRS deployment 210 is used for RIS-assisted mobile edge computing. In yet another example, as shown in FIG. 2*f*, IRS deployment 212 is used for RIS-assisted device to device (D2D) systems.

In general, RISs enable the control of the radio signals between a transmitter and a receiver in a dynamic and goal-oriented way thus turning the wireless environment into a service. This ability in terms of reconfiguring the wireless channel has motivated a host of potential enhancements of various network Key Performance Indicators (KPIs) such as capacity, coverage, energy efficiency, positioning, and security. This is in addition to the support of new capabilities such as sensing and wireless power transfer.

RISs introduce a new system node turning the wireless environment from a passive to an intelligent actor, so the channel becomes programmable. This trend will challenge basic wireless system design paradigms, creating an innovation opportunity, which will progressively impact the evolution of wireless system architecture, access technologies, and networking protocols.

Furthermore, reconfigurable intelligent surface (RIS) can construct an intelligent and programmable radio environment in a controllable way. RIS makes it possible to perform passive reflection, passive absorption, passive scattering and push the physical environment to change towards intelligent and interactive. RIS can change the electromagnetic characteristics of the elements and generate phase shift independently on incident signals without using any RF signal processing. Also, RIS technology has many technical features beyond current mainstream technology. Compared with massive MIMO, RIS-aided wireless network hugely improves the system performance via optimizing the smart signal propagation.

As a key candidate technology in the ongoing disclosure, RIS has many advantages. For instance, RIS element is completely passive and has low power consumption, making it environmentally friendly and sustainable green. RIS design does not need high-cost components such as ADC/ DAC and power amplifier, and hence the feasibility of large-area deployment can be improved greatly. In addition, electromagnetic waves can be reconstructed at any point on its continuous surface, thus form any shape to adapt to different application scenarios and support higher spatial-resolution. RIS makes it possible to intelligently control the propagation environment, improve transmission reliability and achieve higher spectrum efficiency.

RIS can be applicable to one or more scenarios, for example, to overcome the Non-line of sight (NLOS) limitation and deal with the coverage hole problem in an environmentally friendly manner. Another scenario is to serve cell edge users, relieve multi-cell co-channel interference, expand coverage, and implement dynamic mobile user tracking. Further scenarios can be to reduce electromagnetic pollution and solve the multi-path problem. Yet another scenario is to use RIS for positioning, perception, holographic communication and enhance reality. Still further scenario is to realize sensing-communication integration.

Future, evolving communication systems in 5G and 6G networks will face a more complex wireless environment and higher service quality requirements, which will pose greater challenges to RIS architecture and design. Firstly, reasonable electromagnetic model and channel model may need to be established. The fundamental limitation and potential gains of RIS-aided communication systems may need to be explored. A new system and a method are required for channel estimation as no RF chain is configured in RIS.

Secondly, passive beamforming design and passive information transfer optimization are required in the design of IRS architecture. In addition, RIS deployment in 6G will bring a new network paradigm. Furthermore, research and development of new material is one of the bottlenecks in the development of RIS technology. New control mechanism can be explored through electromagnetic modelling, control methods and baseband characterization of meta-surface. Finally, as the theoretical research on electromagnetic propagation and channel models continues to grow, it is necessary to consider data-driven and model-driven AI optimization design to make full use of physical-layer features and improve algorithm efficiency.

As one new fundamental technology, RIS has the characteristics of low cost, low power consumption and easy deployment, supports future green communication, and enables future sensing-communication integration. IRS helps in enhancing the desired signal power while nullifying the reflected interference. Alternatively, the reflected interference can be tuned to cancel the direct interference (although more challenging to implement). This improves cell-edge user's SINR by creating a "signal hotspot" as well as "interference-free zone" in the vicinity of IRS. The disclosure proposes IRS network architectures that can be implemented in all the above use cases/scenarios.

Figure 3:
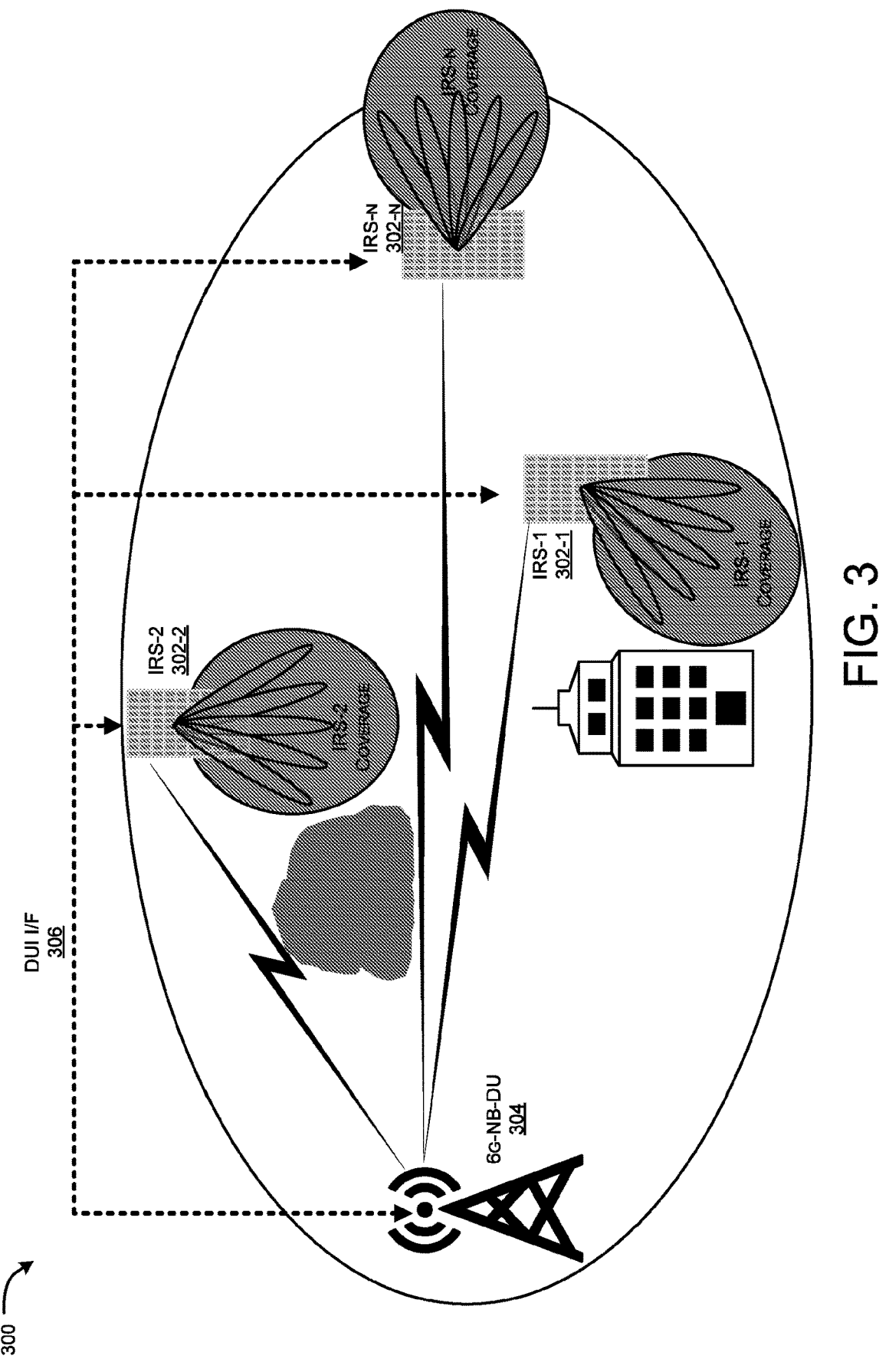
FIG. 3 illustrates an exemplary IRS coverage scenario, in accordance with an embodiment of the present disclosure.

FIG. 3 illustrates an exemplary IRS coverage scenario 300, in accordance with an embodiment of the present disclosure. As shown in the figure, there will be certain areas like behind some tall buildings, behind a small hill structure, or at the cell edges, where there will be a definite chance for signal degradation from a given base station (5G or 6G). In such areas, the base station (BS) signals can be improved by deploying IRS in the appropriate location with appropriate dimensions. Based on the dimension of the IRS, the beamwidth can be adjusted either vertically or horizontally to support one or more UEs affected by such signal degradation. In an embodiment, the beams can also be steered either vertically or horizontally. Based on the dimension of the IRS antenna elements, the maximum steering of a beam, both vertically and horizontally creates a virtual spherical area, which can be called as IRS coverage area. So, users suffering from signal degradation within this kind of spherical coverage area can get improved signals from the base station by using the reflected/regenerated beams from the associated IRS.

Referring to FIG. 3, the IRS-1 (302-1) is deployed in such a way that, it can receive direct signal from the base station 304 and can reflect/regenerate another beam to provide improved base station signal to the area behind a big building. Based on the number of antenna array elements supported by IRS-1 (302-1), the IRS-1 coverage is created virtually. Any UEs within this coverage can benefit from IRS-1 (302-1). Similarly, IRS-2 (302-2) is deployed closer to a small hill to aid the UEs suffering from poor coverage behind the hill.

In case of IRS-N (302-N) scenario, some cell edge UEs were receiving degraded signal from the serving base station and were often getting disconnected abruptly. In such a scenario, the IRS-N kind of deployment aids the cell edge UEs to provide stable and improved signals from the base station consistently. This enables the affected UEs to avoid unnecessary call drops and the IRS-N deployment improves the capacity of the serving cell by extending the coverage, based on the dimensions of the deployed IRS-N. In an embodiment, the base station 304 communicates with IRS-1, IRS-2, and IRS-N via the proposed DUI interface ("DUI I/F") 306.

In an embodiment, within a cell coverage, one or more IRSs can be deployed based on the nature of the geographical area of the cell coverage. The dimension of such IRSs can be same or different, based on the dimension of object obstructing the base station signal. In an embodiment, the obstructing objects may correspond to a tall building, a small hill, and therefore the attenuation is, all along the signal path up to the cell edge. In an embodiment, the deployment of an IRS can be either static, where the possible coverage holes within a cell coverage is know in advance and more or less permanent due to structures like building, tunnels, bridges, hills, trees, etc. In yet another embodiment, the deployment of an IRS can be dynamic, where the possible coverage hole within a cell coverage is temporary, like due to natural calamities, public safety scenarios, public gatherings, etc., in which cases, the IRS can be deployed via UAV, Air balloons, satellites, etc.

The disclosed embodiments propose an IRS and 5G/6G network interface architecture and also a communication protocol between the 5G/6G network and the IRS. Disclosed embodiments also propose a computation of the IRS tilt information (calculated) at the base station and transferred to the IRS via the proposed network interface.

In one embodiment the IRS tilt information is calculated based on SINR or the Reference Signal Received Power (RSRP) or Reference Signal Received Quality (RSRQ) information at the base station. In another embodiment, the beam forming for an IRS will be calculated based on the knowledge of the IRS location and the user location and the provided Channel Quality Indicator (CQI) information from the UE.

In one embodiment, the IRS tilt information is calculated as a precoding matrix or a beam forming or an IRS tilt matrix, also referred to as digital IRS steering or beamforming, as applied in using an antenna array to transmit one or multiple spatially directive signals simultaneously. Every antenna of the IRS transmit array emits a different signal, designed in the digital domain according to the optimization criteria arrived by using the information of the quality of signal as experienced by the UE. In an embodiment, the IRS applies the precoding matrix or a beam forming matrix provided by the base station schedular entity to provide the directivity (beamforming), i.e., aligning the reflective angle of the IRS antenna elements towards the intended UE, and choosing the transmit power (power allocation). In particular, it is also an embodiment of the disclosure to use the or allocate power and phases separately. In essence, precoding is a particular strategy chosen at the transmitter to convey information to one or multiple receivers.

The disclosed mechanism provides for a method in which a base station (BS) is aware of an IRS so that the IRS tilt can be controlled considering a given user (or UE) distribution in the vicinity of a deployed IRS panel. In an embodiment, this is achieved by one or more base stations by considering the user (or UE) and the signal strength (SINR) distribution.

In one embodiment, the disclosed Base Station (BS) is aware of an IRS either through prior knowledge encoded in a database or via a signalling mechanism between the IRS and the BS (described later in the description). When an IRS comes up in the network or become active, it may be configured to send a handshake signal to all connected BSs via the available physical connection. One or more of the following information may be exchanged such as but not limited to: an IRS ID, a location in latitude/longitude etc. In an embodiment, the connection between the IRS and a BS can be via an RF connection (IAB, Microwave link etc.).

Figure 4:
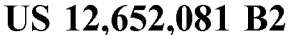
FIG. 4 illustrates an exemplary IRS deployment scenario, in accordance with an embodiment of the present disclosure.

A network interface protocol is disclosed that includes a handshake signal schema as proposed in this disclosure. In one embodiment, a mechanism of interfacing between the Base Station (BS) and an IRS panel is shown in FIG. 4. With reference to FIG. 4, a direct connection is established between the BS and the IRS via a micro controller (also referred to as IRS controller hereinafter) to implement the mechanism of computing a tilt control information for a given time period and conveying such information to the IRS via the connection.

There may be two aspects to controlling the IRS panel tilt by a BS. In an embodiment, the BS is configured to collect a signal-to-noise-plus-interference ratio (SINR) profile at the BS and then generate a RF Signature profile for the region in the vicinity of the IRS. In an exemplary embodiment, the SINR profile is collected via one or more enhanced user measurement reports generated by a UE in the region served by the BS and sent to the BS.

In another embodiment, the BS (or a schedular module in BS) is configured to compute the tilts necessary to achieve a SINR objective and perform the same with one or more information elements such as but not limited to user distribution, user or SINR or Block Error Rate (BLER) profiles for a given region. In an embodiment, the tilt can be based on the user location information that can be obtained by the sensing mechanism implemented in the UE and such information is fed to the BS (schedular).

The disclosed IRS architecture also describes a mechanism for collection of the above information from the UE and management of such collection mechanism. In an embedment, one or more control messages are transmitted from the BS to the IRS. In an embodiment, the periodicity of such control messages may be pre-configured based on the requirement or other factors.

In an embodiment, the IRS can be controlled by the BS using one or more control messages. In particular, the radio controller (Radio Resource Management entity or the baseband entity), the core network or any intelligent entities or network device such as but not limited to the O-RAN RIC (Radio intelligent controller) can communicate the control messages and control the IRS.

In one of the embodiments, a 6G NR DU and an IRS interface is proposed which has been referred to in this description as the "DUI I/F". It is implemented as a logical interface between a BS and an IRS controller, to exchange the signalling messages between the DU and the IRS as described in detail later in this description.

FIG. 4 illustrates an exemplary IRS deployment scenario, in accordance with an embodiment of the present disclosure. In one embodiment, a mechanism of interface between a Base Station (BS) and an IRS panel is provided. As shown, IRS 404 comprises a copper backplane and a control circuit board. The IRS 404 and Base station 402 communicate via a microcontroller 406 that may or may not be a part of the IRS 404 to exchange messages (e.g., control messages).

Figure 5A:
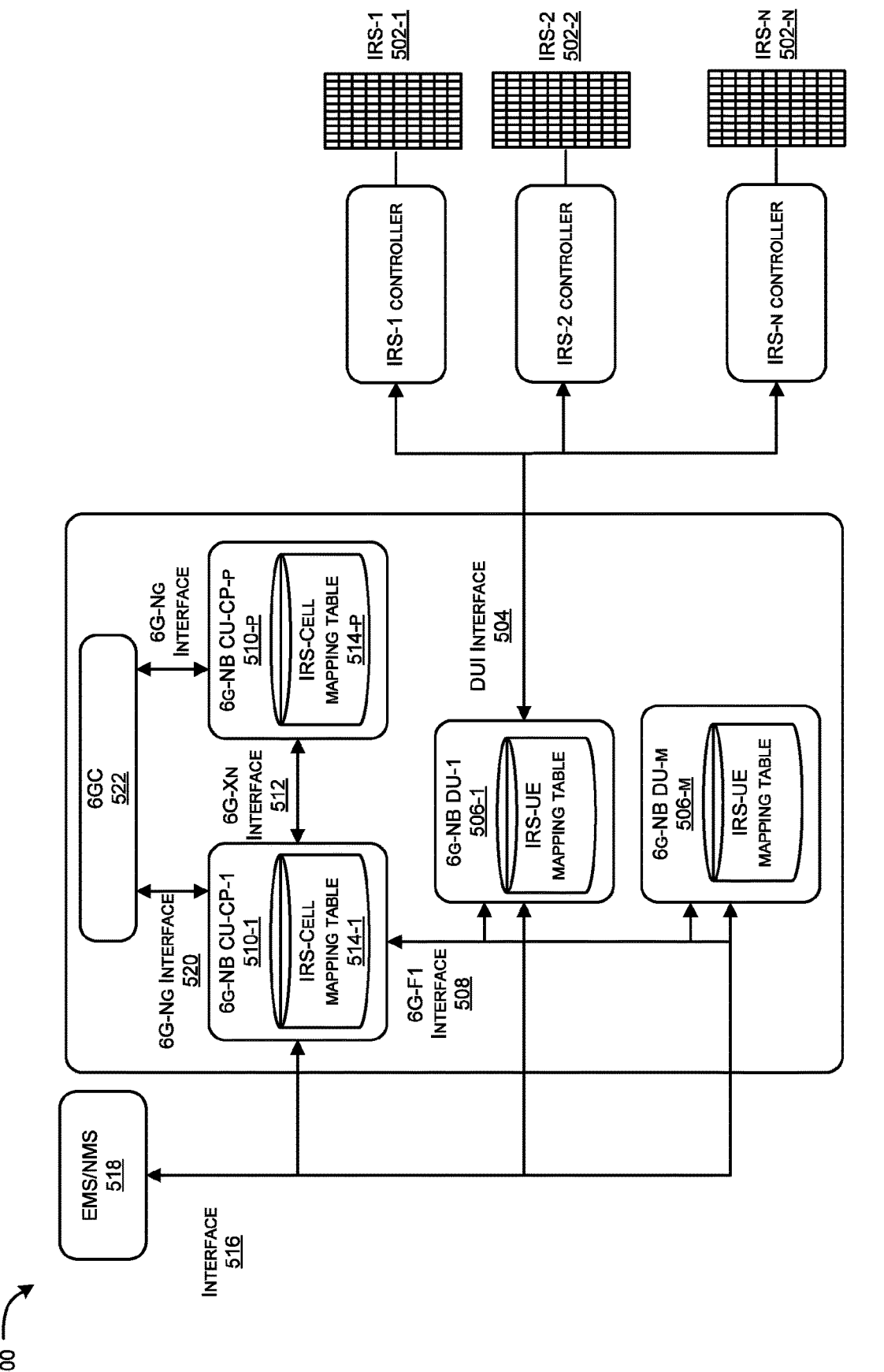
FIG. 5a illustrates an exemplary functional architecture of RAN interfacing with IRS, in accordance with an embodiment of the present disclosure.

FIG. 5a illustrates a functional architecture 500 of a next generation or future generation RAN (e.g., 6G RAN) with IRS support. For illustration purposes, various blocks or modules or subsystems of the disclosed base station or network device are shown in the architecture 500. In an embodiment, the 6g-NB-DUs (6G Base station Node DUs) 506-1 and 506-M support multiple cells and each cell can be connected to one or more IRS controllers (e.g., IRS-1 controller, IRS-2 controller, IRS-3 controller) via the proposed DUI I/F 504. Each of the IRS controllers correspond to IRS-1 (502-1), IRS-2 (502-2), and IRS-3 (502-3) respectively. In an embodiment, the 6g-NB-CUs (6G Base station Node CUs) 510-1 and 510-P maintain an IRS-Cell mapping table (e.g., 514-1 and 514-P) for each supported cell context as shown in the figure. The 6g-NB-CUs (6G Base station Node CUs) communicate with each other via 6G-XN interface 512. The 6g-NB-CUs (6G Base station Node CUs) communicate with the sixth generation code (6GC) 522 via 6G-NG interface 520.

In an exemplary embodiment, whenever an IRS is deployed in a cell, an entry is created in an IRS-Cell mapping table maintained in the 6g-NB-CU (6G Base station Node CU). In an embodiment, the entry includes an IRS-ID, IRS capabilities like number of antenna elements supported by the IRS, mechanical/electrical tilt support, active/passive support, geographical location like altitude, azimuth, elevation, coverage capabilities of the IRS, sharable/not sharable status, deployment details in cell edge/cell mid/cell centre regions, etc. In an embodiment, the above-mentioned information may be obtained either from Element Management System (EMS) or directly from the IRS controller during the (DU-IRS) DUI-AP (Application protocol) setup procedure (explained later with reference to FIGS. 7a-g). In an embodiment, the IRS-Cell mapping table may be managed or updated in real time or may be configured periodically. In yet another embodiment, the IRS-Cell mapping table may be managed as per a predetermined plan based on the network use cases/scenarios anticipated in a particular geolocation.

In an embodiment, a UE may be configured to frequently update or transmit its physical location information to the 6G-NB-CU-CP either using Radio Resource Control (RRC) Measurement Report message or a new RRC message like UE Location Info Update. Whenever the reported UE location is falling or coming closer to any pre-deployed IRS coverages, then the 6g-NB-CU-CP (e.g., 510-1) intimates the UE details, its location information, the associated IRS information to the 6g-NB-DU (e.g., 506-1). Thereafter, the 6g-NB-DU (e.g., 506-1) creates an entry in its IRS-UE mapping table and requests the given UE to start reporting the current location information, mobility speed, direction of travel, etc., while reporting periodic or a periodic channel state information (CSI) reports. When the given UE sends this additional information, the 6g-NB-DU (e.g., 506-1) verifies whether the UE has entered the IRS coverage area and if it is under the specific IRS. Thereafter, the 6g-NB-DU (e.g., 506-1) starts coordinating with the associated IRS controller (e.g., IRS-1 controller) and reserves the number of antenna array elements for reflecting the specific beam towards the UE.

If multiple UEs are present in the IRS coverage area, then the 6g-NB-DU determines whether different beams (other than the already generated beam) need to be created to serve those UEs. In an embodiment, it may be up to the 6g-NB-DU to determine whether to have only the reflected beam or both the direct beam and the reflected beam for the given UE. In case the UE is served by both the direct and the reflected beams, there may be no issues when the UE is crossing from the IRS coverage area into the normal cell coverage area served by the 6g-NB-DU (or BS). However, when the UE is served by only the reflected beam, then the 6g-NB-DU needs to closely track the UE movements crossing from the IRS coverage area into the normal cell coverage area and trigger the Intra-Cell Inter-beam handover at the appropriate instance.

In an embodiment, the 6g-NB-CU-CP can either activate or deactivate the usage of IRS by the 6g-NB-DU, by sending an IRS activate or an IRS deactivate message to the 6g-NB-DU via 6g-F1 interface 508. The 6g-NB-CU-CP (e.g., 510-1) updates/transmits the IRS details and usages to the EMS 518 frequently, via the SNMP/TR069/O1 interface 516, which may be used for additional billing purposes if needed.

It may be appreciated by those skilled in the art that exemplary use cases described with respect to FIGS. 2a-2f may be implemented using the functional architecture 500 with IRS support/deployment. In general, the disclosed IRS architecture may be implemented to use as smart nearly passive relays for coverage extension, use as single-RF multi-stream transmitter for capacity improvements, and use for information aided transmission in the context of ambient backscattering and symbiotic radio. For example, as shown in FIG. 2a, IRS deployment 200 is used in RIS-assisted Unmanned Arial Vehicle (UAV) and can implement the disclosed IRS network architecture. In yet another example, as shown in FIG. 2b, IRS deployment 204 is used for RIS-assisted mm Wave communication and can implement the disclosed IRS network architecture. In yet another example, as shown in FIG. 2c, IRS deployment 206 is used for RIS-assisted simultaneous wireless information and power transfer (SWIPT) and can implement the disclosed IRS network architecture. In yet another example, as shown in FIG. 2d, IRS deployment 208 is used for RIS-assisted physical layer security and can implement the disclosed IRS network architecture. In yet another example, as shown in FIG. 2e, IRS deployment 210 is used for RIS-assisted mobile edge computing and can implement the disclosed IRS network architecture. In yet another example, as shown in FIG. 2f, IRS deployment 212 is used for RIS-assisted device to device (D2D) systems and can implement the disclosed IRS network architecture.

Figure 5B:
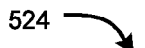
FIG. 5b illustrates an exemplary network device implemented in the IRS network architecture in accordance with an embodiment of the present disclosure.
Figure 5B:
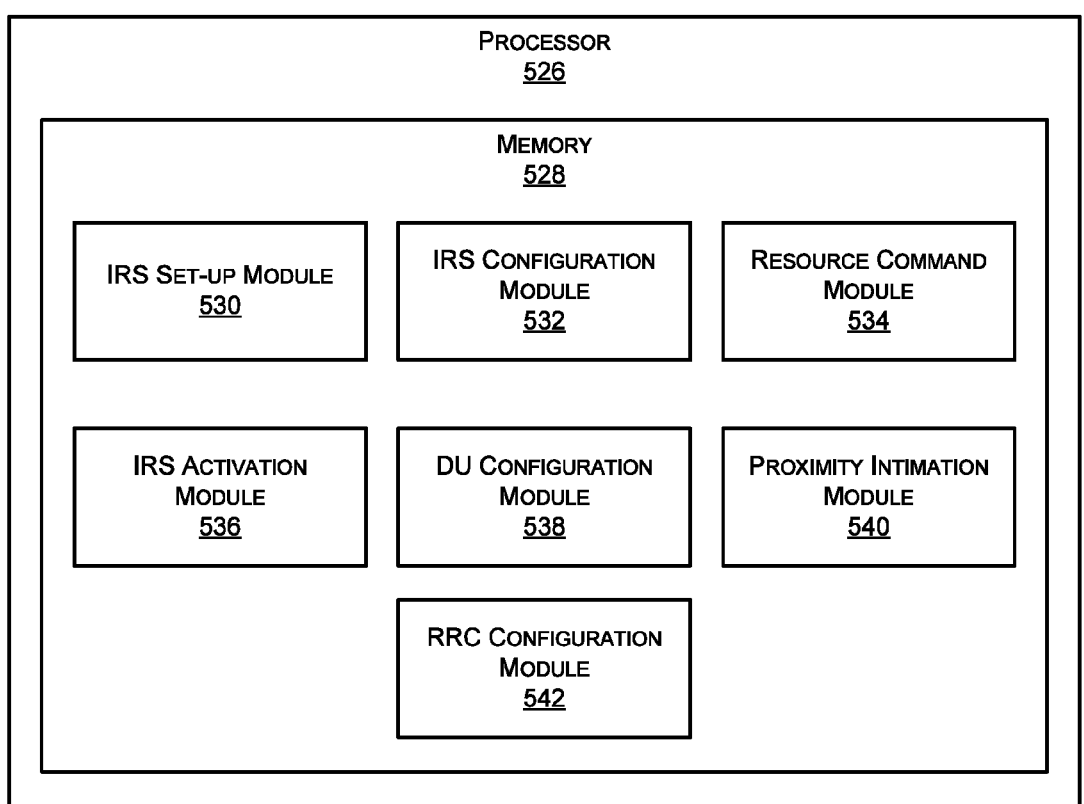

FIG. 5b illustrates a network device 524 in accordance with an embodiment. One or more components of the 6G network or 5G network described with reference to FIG. 5a can be integrated and implemented as the proposed network device 524.

In an embodiment, the network device 524 may include one or more processors 526 coupled with a memory 528, wherein the memory may store instructions which when executed by the one or more processors may cause the network device 524 to implement the disclosed IRS architecture. The one or more processor(s) (526) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (526) may be configured to fetch and execute computer-readable instructions stored in a memory 528 of the network device 524. The memory 528 may be configured to store one or more computer-readable instructions or routines in a non-transitory computer-readable storage medium, which may be fetched and executed to create or share data packets over a network service. The memory 528 may comprise any non-transitory storage device including, for example, volatile memory such as RAM, or non-volatile memory such as EPROM, flash memory, and the like.

The memory 528 includes one or more modules such as IRS Set-up module 530, IRS Configuration module 532, Resource Command module 534, IRS Activation module 536, DU Configuration module 538, Proximity Intimation module 540, and RRC Configuration module 542. The IRS Set-up module 530 is configured to execute one or more steps or procedures (e.g., 700) for the initial set-up of an IRS. The IRS Configuration module 532 is configured to execute one or more steps or procedures (e.g., 706) for configuration of the IRS as detailed later in the description. The Resource Command module 534 is configured to execute one or more steps or procedures (e.g., 708) to command the reservation of antenna array elements (or other resources) of the IRS for communication with UE. The IRS Activation module 536 is configured to execute one or more steps or procedures (e.g., 710, 720) to activate or deactivate the IRS. The DU Configuration module 538 is configured to execute one or more steps or procedures (e.g., 712) indicating the latest set of IRSs deployed and their details. The Proximity Intimation module 540 is configured to execute one or more steps or procedures (e.g., 716) whenever one or more UEs (e.g., 718) are detected in the proximity of the specific IRS coverages. The RRC Configuration module 542 is configured to execute one or more steps or procedures for Radio Resource Control (RRC) connection reconfiguration. The RRC connection reconfiguration procedure is used to configure the measurement control in order to add a location information of the UE in one or more measurement reports received from the UE.

In an embodiment, the one or more modules described above may be configured to perform one or more functions, steps, procedures described herein in the context of 6G network. For instance, all the steps for implementing a communication protocol (and protocol stack thereof) between the 6G network and one or more IRSs can be performed by the network device 524. Furthermore, steps, procedures involved in configuration and/or setting up of one or more IRSs can also be performed by the network device 524. Furthermore, the steps or procedures of setting-up the UE to periodically send measurement reports can be performed by the network device 524 for example, by the RRC Configuration module 542.

In addition, the steps or procedures for processing and analyzing the measurement reports from the UE to determine tilts (i.e., tilt information) for the IRS can be performed by the network device 524. Although, different nodes or modules may have been described as performing various functions and steps for providing disclosed IRS architectures, it may be appreciated that all or some of the functions may be performed by one or more network devices 524. For instance, the network device 524 may be a 6G enabled network device that includes one or more processors 526 coupled to the memory 528 storing a set of instructions which when executed by the one or more processors cause the network device to compute IRS tilt information associated with the one or more IRSs based at least in part on a first set of information received from the one or more UEs. The first set of information comprises one or more of signal-to-noise-plus-interference ratio (SINR) information, Reference Signal Received Power (RSRP) information, and Reference Signal Received Quality (RSRQ) information received from the one or more UEs.

The one or more processors 526 further cause the network device 524 to communicate the computed IRS tilt information to the one or more IRSs via a network interface, wherein the IRS tilt information is used to control one or more operational aspects of the one or more IRSs. The one or more operational aspects of the one or more IRSs include mechanical aspects such as but not limited to mechanical tilt. In an embodiment, the one or more operational aspects of the one or more IRSs include digital aspects such as a digital tilt. In an embodiment, the one or more operational aspects of the one or more IRSs include electrical aspects such as but not limited to transmission power. It may be appreciated that each of the one or more IRSs include a plurality of tiles or panels. In an exemplary embodiment, the disclosed operational aspects of the one or more IRSs can be controlled at various levels of granularity, for example, at a tile level, at a panel level, and so on.

In an embodiment, the one or more processors 526 further cause the network device 524 to compute the IRS tilt information based on one or more of location of the one or more IRSs, location of the one or more UEs, and channel quality indicator (CQI) information from the one or more UEs, wherein the IRS tilt information is indicative of beam forming for the one or more IRSs.

In an embodiment, the one or more processors 526 further cause the network device 524 to compute the IRS tilt information as a precoding matrix or a beam forming or an IRS tilt matrix that is used to transmit one or multiple spatially directive signals simultaneously from each of the one or more IRSs, wherein each of the one or more IRSs comprises of a plurality of antennas. In an embodiment, every antenna of the one or more IRS transmit array is configured to emit a different signal, designed in digital domain based on the respective IRS tilt information. In an embodiment, the one or more IRSs apply the precoding matrix or the beam forming matrix provided by the network device 524 to provide directivity towards an intended UE of the one or more UEs and choose a corresponding transmit power.

In an embodiment, the one or more IRSs uses the IRS tilt information to compute a digital tilt and a mechanical tilt for each of the antennas and to allocate power and phases to each of the antennas. In an embodiment, the one or more processors 526 further cause the network device 524 to be aware of the one or more IRSs either through prior knowledge encoded in a database or via a signalling mechanism established between the one or more IRSs and the network device via the network interface. In an embodiment, the one or more processors 526 further cause the network device 524 to receive a handshake signal from a new IRS when activated via a physical connection between the new IRS and the network device during a setup process.

In an embodiment, the one or more processors 526 further cause the network device 524 to create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details. In an embodiment, the network interface implements a network interface protocol that is established between the network device and the one or more IRSs, wherein the network interface protocol includes a handshake signal schema.

In an embodiment, the network interface is established through a direct connection between the network device 524 and the one or more IRSs via a micro controller. In an embodiment, the one or more processors 526 further cause the network device 524 to compute the IRS tilt information necessary to achieve a SINR objective based on one or more of a user distribution, user profiles, SINR profiles, and Block Error Rate (BLER) profiles for a given region serviced by the network device. In an embodiment, the one or more processors 526 further cause the network device 524 to send one or more control messages to the one or more IRSs at a pre-configured periodicity, wherein the one or more IRSs are controlled by the network device using the one or more control messages.

In an embodiment, various modules may be integrated together or may be implemented in multiple network devices (524) to achieve the same or similar functionality without departing from the scope of the ongoing description. For instance, the network device 524 corresponds to one or more nodes in the next generation RAN (e.g., 6G RAN) with IRS support. In an embodiment, the network device 524 may correspond to 6g-NB-DUs (6G Base station Node DUs) and/or the 6g-NB-CUs (6G Base station Node CUs) or an integration thereof. In yet another embodiment, the network device 524 may correspond to a Base Station (BS) or any such network entity that can be configured to communicate with IRS and/or UE in the context of the ongoing description.

In an embodiment, the network device 524 enables a network interface protocol establishment with the IRS as described with reference to FIGS. 7a-7g. In an embodiment, a DU-I interface (or DU I/F) is established between the network device and the IRS using various setup procedures outlined herein. Using the proposed network interface, the network device 524 may enable setting-up of an IRS that is available for reflecting signals to one or more UEs in a particular region or area serviced by the network device 524. A mapping of one or more parameters of the IRS to a mechanical or digital tilt for optimal performance is predetermined and stored at the network device 524. The network device 524 receives one or more measurement reports from the one or more UEs to determine, in run-time, the optimal mechanical or digital tilt based at least in part on the predetermined mapping. The network device 524 sends the optimal mechanical or digital tilt information using the proposed network interface to the IRS and the IRS controller uses the optimal tilt information to re-align the IRS panels or IRS tiles.

In yet another embodiment, the network device 524 performs all the functions, steps, procedures to instruct the UE to perform measurement of one or more parameters associated with the IRS or otherwise. For instance, the network device (524) may provide/configure trigger events in the UE to trigger any such measurements. Such measurement may be performed by the UE and sent to the network device 524 in the form of one or more measurement reports. The network device 524 may determine a tilt information or data to be communicated to the IRS controller based on the one or more measurement reports. In yet another embodiment, the network device 524 enables configuration of IRS in such a manner that the IRS controller reserves a portion of the IRS resources for the network device 524. Likewise, another network device 524 may share the resources of the IRS by configuring yet another portion of the IRS resources by communicating with the IRS controller as described herein.

In an embodiment, a User Equipment (UE) in communication with one or more Intelligent Reflecting Surface (IRSs) and one or more network devices is disclosed. The UE comprises one or more processors coupled to a memory storing a set of instructions which when executed by the one or more processors cause the network device to transmit a first set of information. In an embodiment, the first set of information comprises one or more of signal-to-noise-plus-interference ratio (SINR) information, Reference Signal Received Power (RSRP) information, Reference Signal Received Quality (RSRQ) information, location and channel quality indicator (CQI) information associated with the UE to the one or more 6G network devices. The one or more 6G network devices are configured to compute IRS tilt information associated with the one or more IRSs based at least in part on the first set of information received from the one or more UEs. The one or more 6G network devices are configured to communicate the computed IRS tilt information to the one or more IRSs via a network interface, wherein the IRS tilt information is used to control one or more operational aspects of the one or more IRSs.

Figure 6:
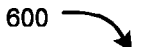
FIG. 6 illustrates exemplary DUI protocol interface stack, in accordance with an embodiment of the present disclosure.
Figure 6:
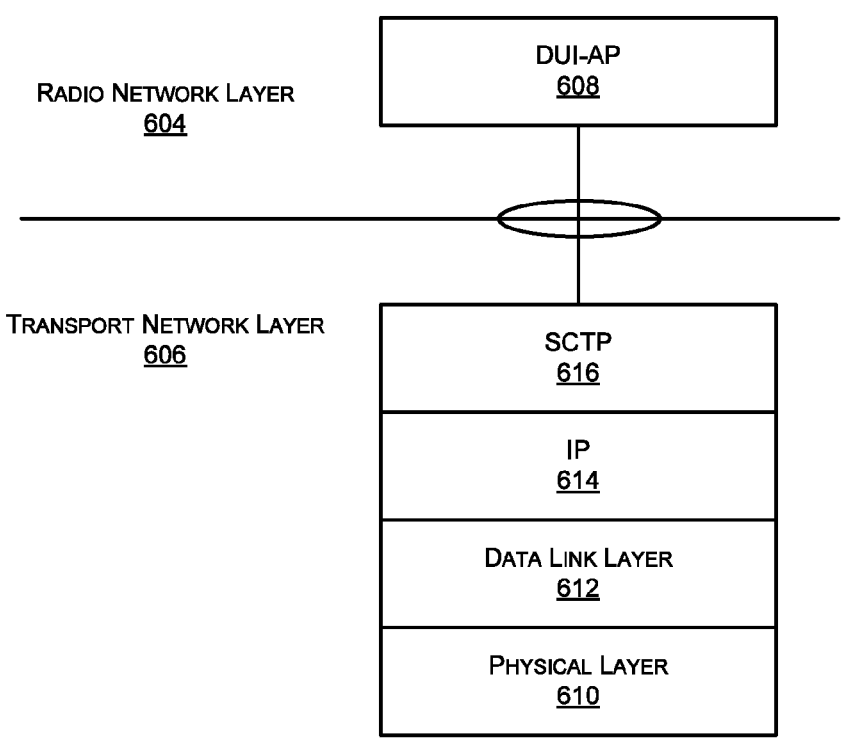

FIG. 6 illustrates a DUI (DU-IRS) Interface protocol stack 600 in accordance with an embodiment of the disclosure. As shown, the protocol stack includes radio control layers 604 and transport control layers 606. The radio control layers 604 include the (DU-IRS) DUI-AP (Application protocol) layer 608. The transport control layers include the physical layer 610, data link layer 612, IP layer 614, and Stream Control Transmission Protocol 616. In an embodiment, the network device (524) or the BS establishes the DUI (DU-IRS) protocol stack to enable communication between the BS and the IRS for configuration, set-up and control purposes as described herein. Various configuration messages with specific format may be used to support the communication protocol in the context of 6G networks.

Figure 7A:
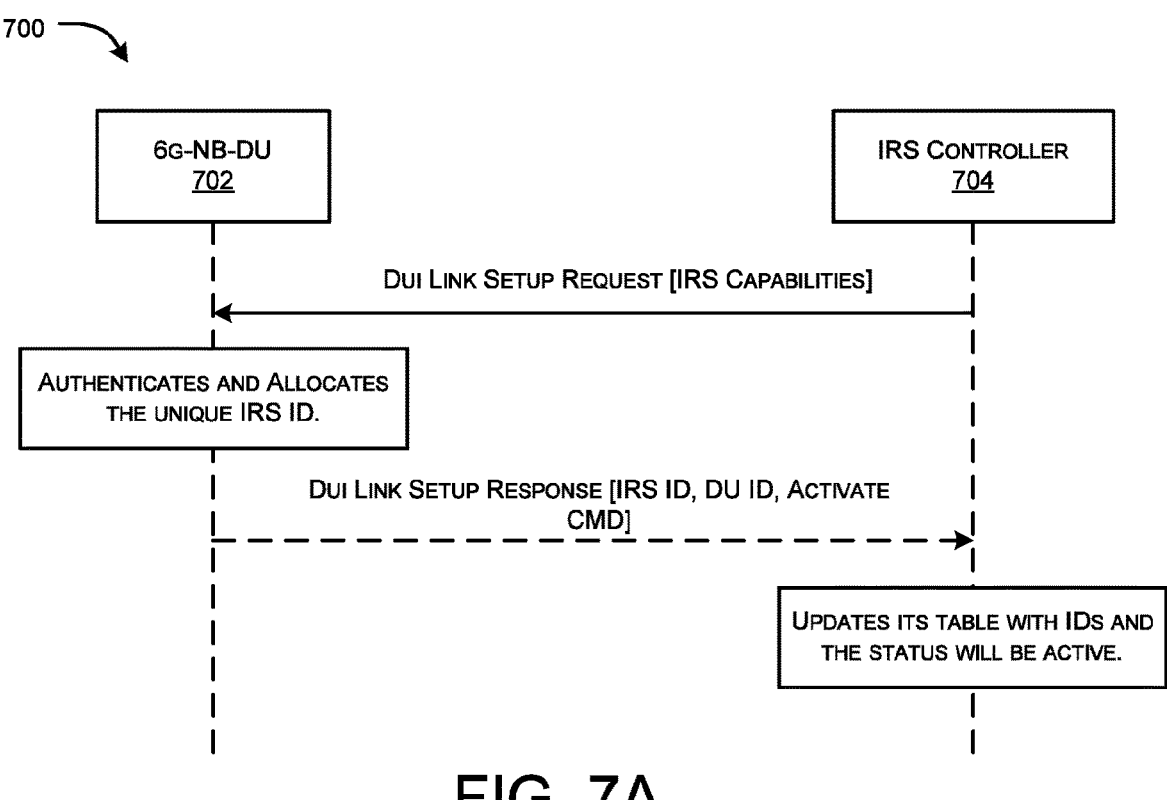
FIGS. 7a-7g illustrate the exemplary steps involved in the interfacing protocol between RAN and IRS, in accordance with an embodiment of the present disclosure.
Figure 7B:
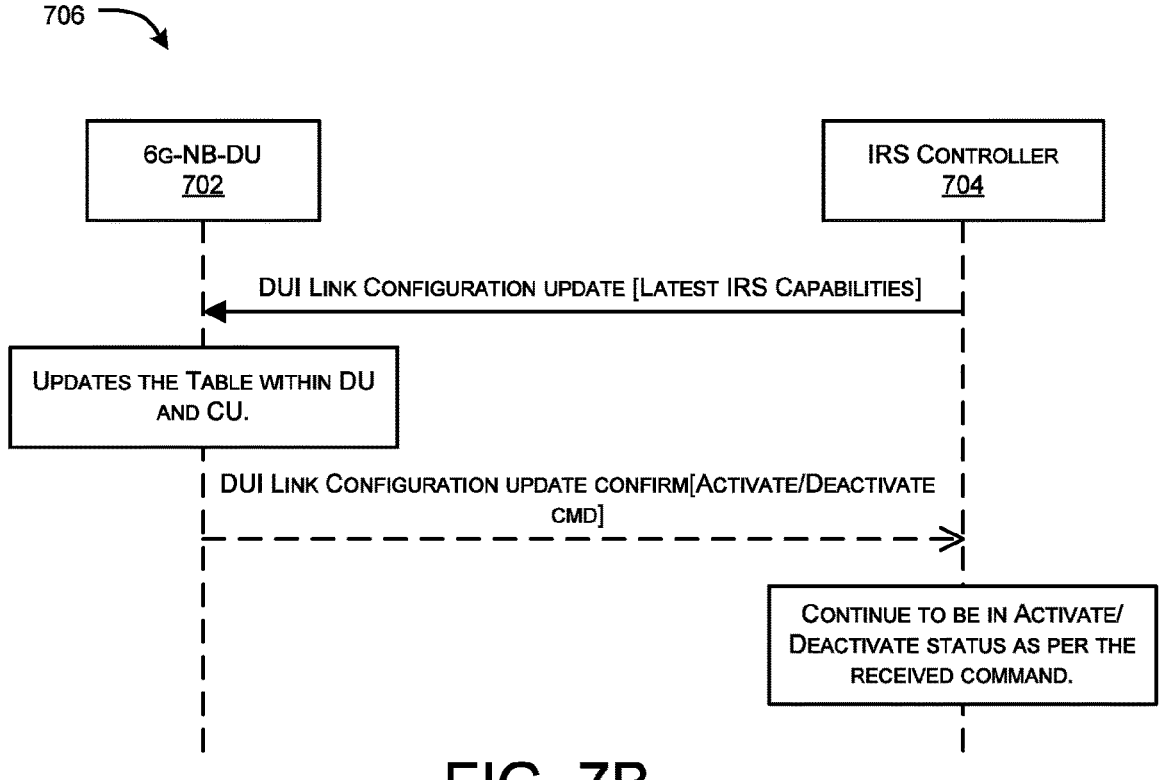
Figure 7C:
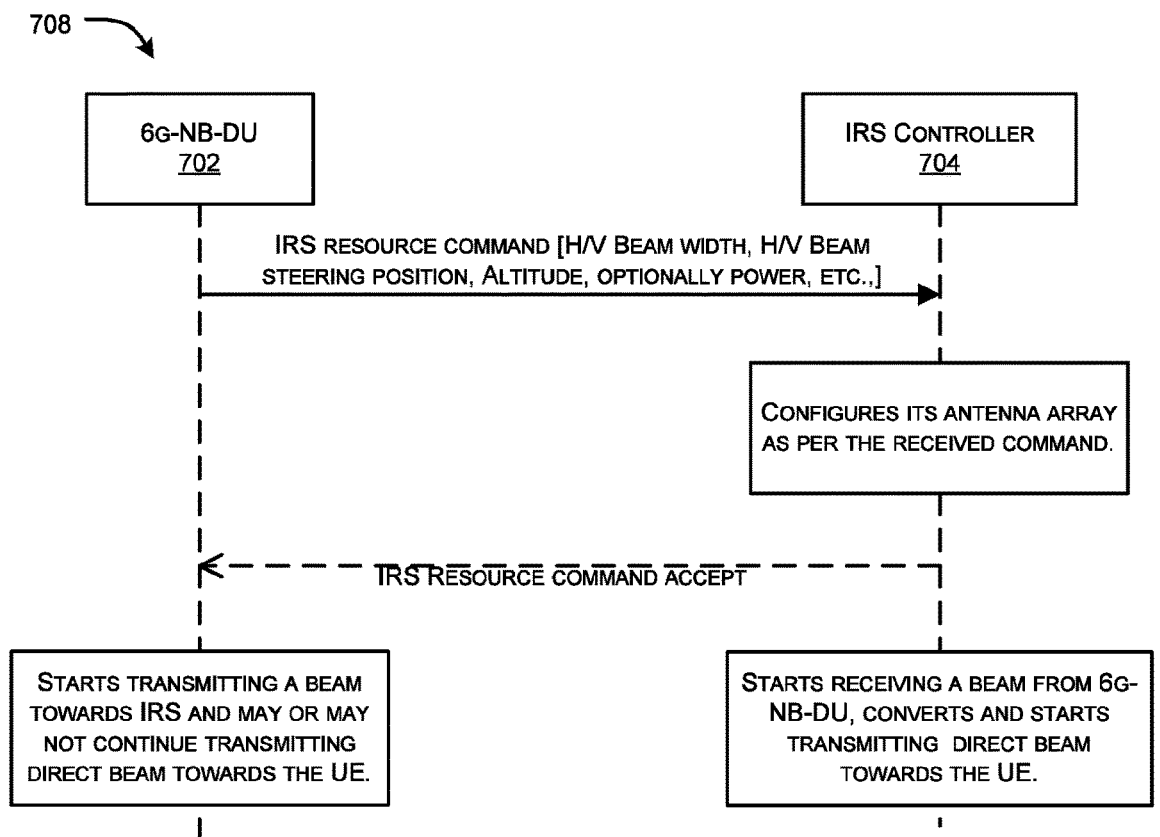
Figure 7D:
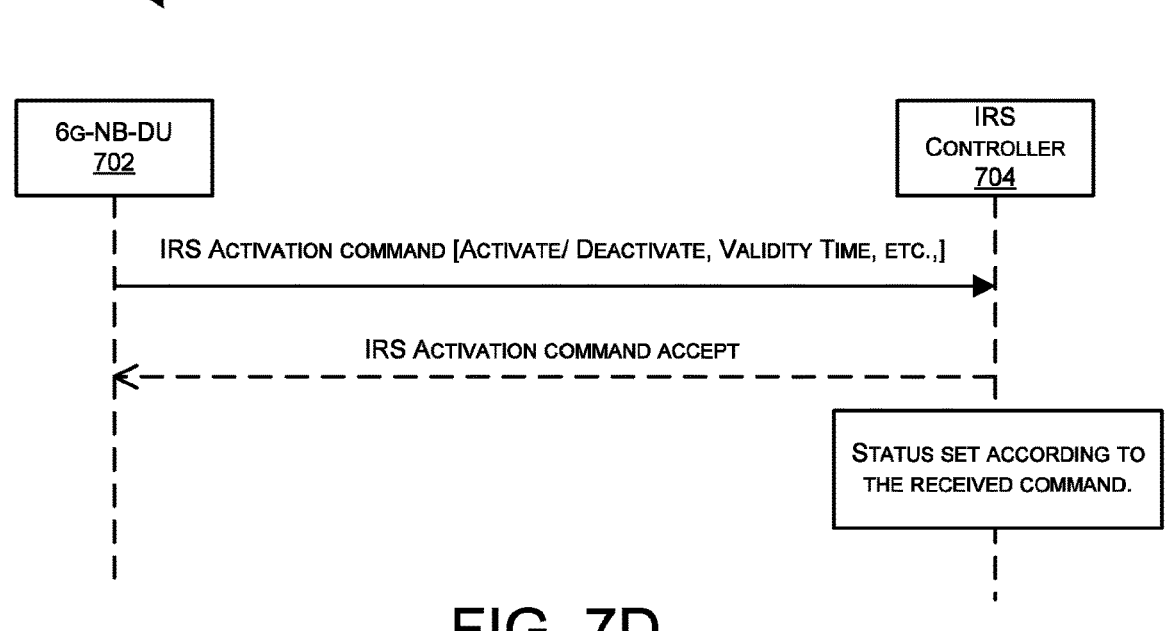

In an embodiment, DUI may be implemented as a logical or physical interface between a DU and an IRS controller. The disclosed DUI protocol stack is implemented at both the ends of the DUI interface. For example, one implementation is at the DU end and the other implementation is at the IRS controller end. The Transport network layer, which includes the Physical Layer, Data Link layer, IP layer and the SCTP layer may be implemented as per the standard definitions known in the art. In an embodiment, the Radio Network layer that includes DUI-AP that is DU-IRS interface Application component implements layer3 control protocol. The procedures and the messages associated with DUI-AP will be explained in detail with reference to sequence diagrams shown in FIGS. 7a-7d. For example, protocol communication messages include "DUI LINK SETUP REQUEST" and "DUI LINK SETUP RESPONSE" as shown in FIG. 7a, "DUI LINK CONFIGURATION UPDATE" and "DUI LINK CONFIGURATION UPDATE CONFIRM" as shown in FIG. 7b, "IRS RESOURCE COMMAND" and "IRS RESOURCE COMMAND ACCEPT" as shown in FIG. 7c, "IRS ACTIVATION COMMAND" and "IRS ACTIVATION COMMAND ACCEPT" as shown in FIG. 7d. The proposed protocol communication messages are part of the proposed DUI-AP protocol.

In an embodiment, the DUI-AP may be realized by an initial set of procedures used in the DUI I/F as illustrated in FIGS. 7a-7g.

FIG. 7a illustrates a DU I/F setup procedure 700 is initiated by the IRS controller 704 towards the 6g-NB-DU 702, to establish the DUI link. In an embodiment, when a new IRS comes up or become active or available, the corresponding IRS controller (e.g., 704) shares/sends its capabilities to the 6g-NB-DU 702 via a setup request message. The 6g-NB-DU 702 authenticates the new IRS and allocates a unique IRS ID and issues the "Activate" command to the IRS controller 704 by sending the setup response message. The IRS controller 704 updates its tables with IDs and the status is set to "active".

FIG. 7b illustrates a DU I/F Configuration update procedure 706. This procedure is initiated by the IRS controller 704 towards the 6g-NB-DU 702, to update the changes in its capabilities. In an embodiment, the IRS controller 704 shares its updated capabilities to the 6g-NB-DU 702 via the "Configuration update" message. The 6g-NB-DU 702 updates its IRS-UE table and sends the updates to the associated 6g-NB-CU-CP and issues the "Activate/Deactivate" command based on the updates to the IRS controller 704 by sending the "Configuration update confirm" message. Thereafter, the IRS controller 704 continues to be in "activate/deactivate" status as per the received command.

FIG. 7c illustrates an IRS Resource Command procedure 708. This procedure is initiated by the 6g-NB-DU 702 towards the IRS controller 704, to command the reservation of antenna array elements for communication with 6g-NB-DU 702 and also to communicate with a UE directly. Therefore, one set of antenna array (of the given IRS) may be reserved for communications with the 6g-NB-DU 702 for a particular UE and another set of antenna array is reserved for communications with the UE directly. Here, the 6g-NB-DU 702 can share the details like horizontal and vertical beam width, horizontal and vertical beam steering position, altitude of the given UE to point the beam towards, etc. Therefore, the 6g-NB-DU 702 sends the IRS resource command message to the IRS controller 702. The IRS controller configures the antenna array of the IRS as per the received command, reserves the required antenna array elements and responds to 6g-NB-DU 702 by sending IRS Resource Command accept message. The IRS resource command can also contain the pre-coded matrix that provides the power and phase for each element that the IRS should employ to achieve the necessary directionality in the reflection of the signals from the base station. Upon receipt of the IRS Resource Command accept message, the 6g-NB-DU 702 starts transmitting a beam towards the IRS and may or may not continue transmitting direct beam towards the UE. The IRS controller 704 configures the IRS to start receiving the beam from 6g-NB-DU 702, convert and start transmitting direct beam towards the UE.

FIG. 7d illustrates an IRS Activation command procedure 710. This procedure is initiated by the 6g-NB-DU 702 towards the IRS controller 704, to activate or deactivate the IRS. The 6g-NB-DU 702 sends an IRS activation command (activate/deactivate, validity time, etc.) message to the IRS controller 704. The IRS controller 704 sends an IRS activation command accept message to the 6g-NB-DU 702. The IRS controller 704 is configured to set the status of the IRS according to the received command. In an embodiment, this procedure is predominantly used during the energy saving scenarios and during maintenance scenarios.

Figure 7E:
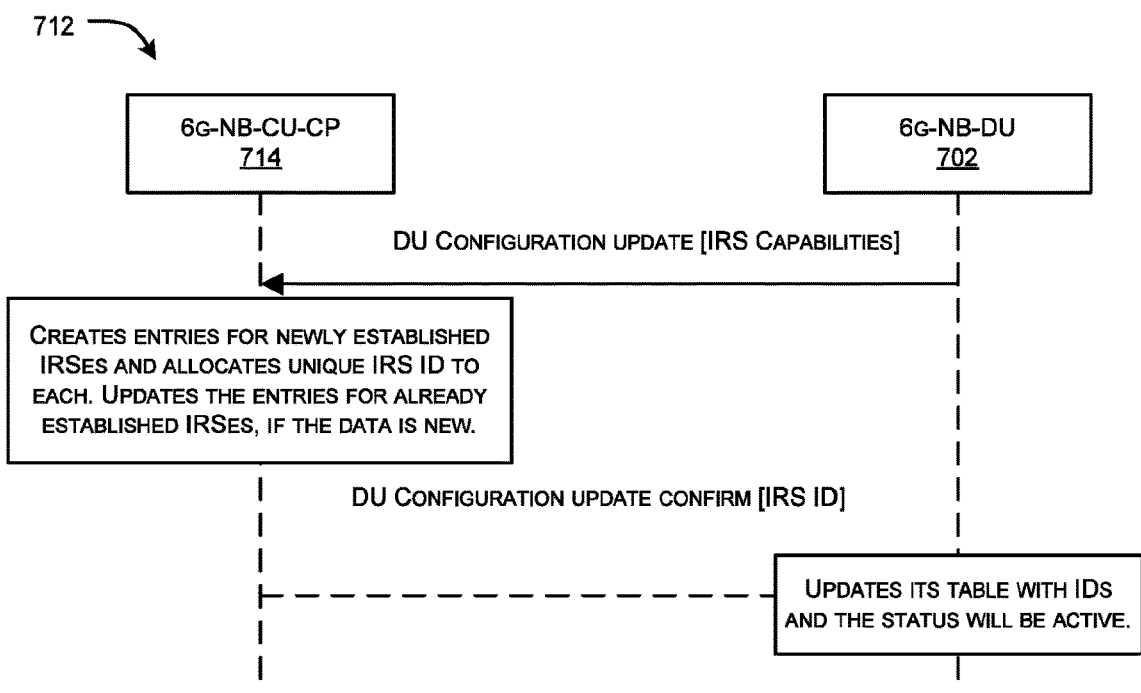
Figure 7F:
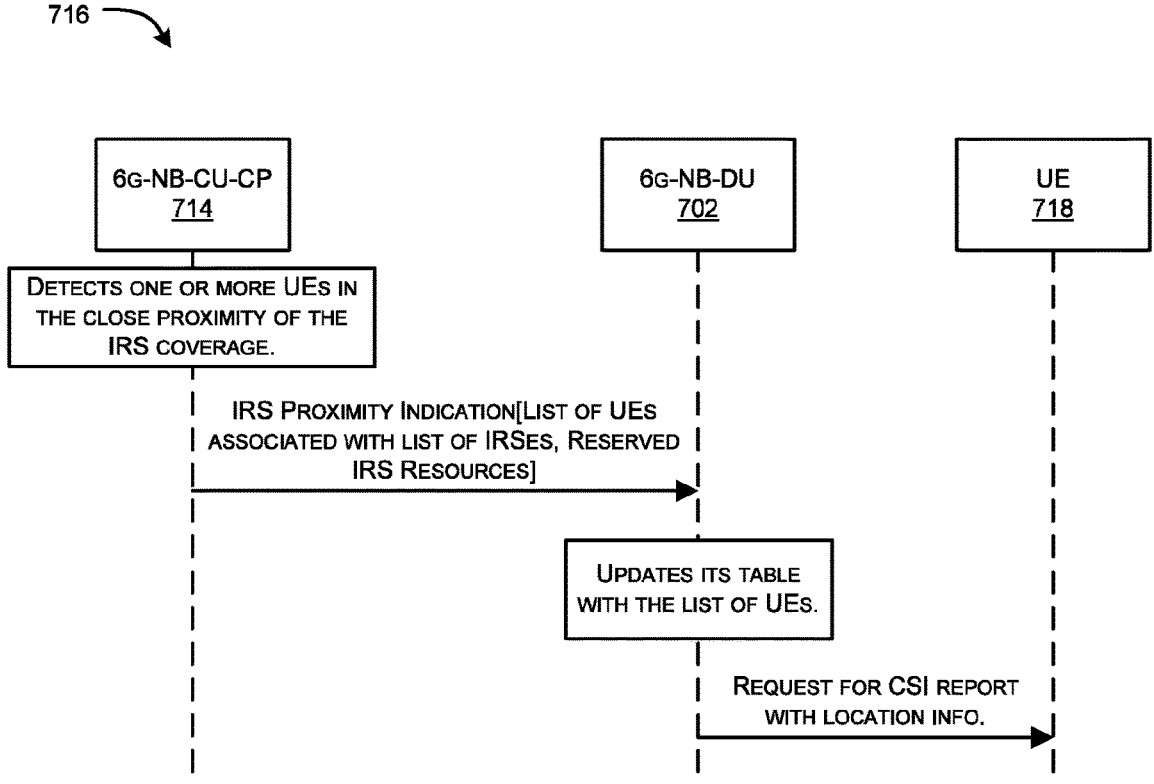
Figure 7G:
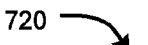
Figure 7G:
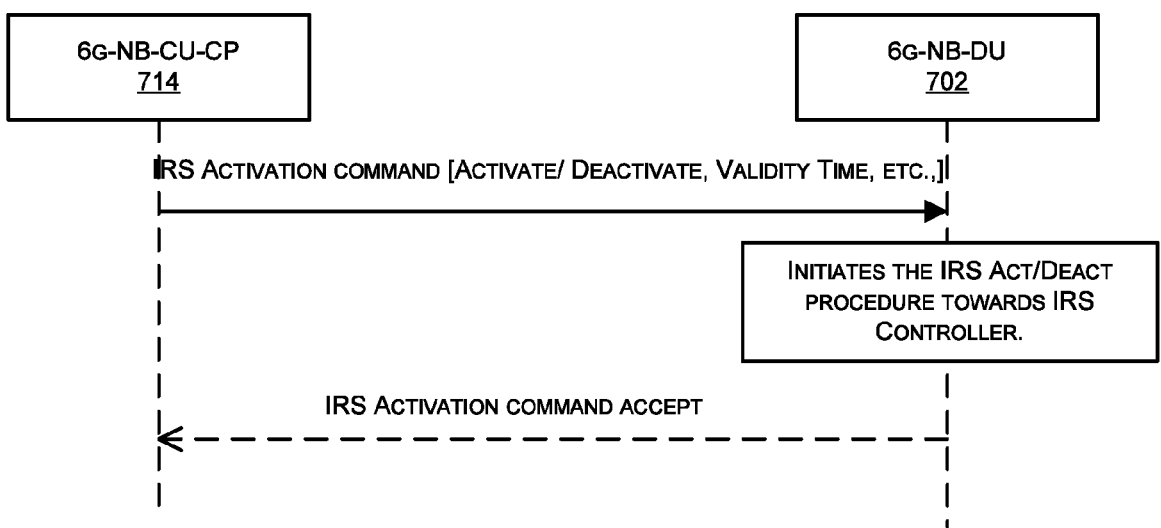

FIGS. 7e-7g illustrate initial set of procedures to support the IRS. FIG. 7c illustrates a DU Configuration Update procedure 712. This procedure is initiated by 6g-NB-DU 702 towards 6g-NB-CU-CP 714, indicating the latest set of IRS deployed and their details. In an embodiment, the 6g-NB-CU-CP 714 creates entries for those IRSs which are new and allocates a unique IRS ID for each and updates the details of other IRSs, which are already existing in the IRS-Cell mapping table. The 6g-NB-CU-CP 714 responds with DU Configuration update confirm with the list of newly allocated IRS-IDs associated with newly established IRS. The 6g-NB-DU 702 updates its table with IDs and the status of the respective IRSs will be set to active.

FIG. 7f illustrates IRS Proximity Indication procedure 716. This procedure 716 is initiated by 6g-NB-CU-CP 714 towards 6g-NB-DU 702, whenever one or more UEs (e.g., 718) are detected in the proximity of the specific IRS coverages, indicating to initiate the coordination with specific IRS, w.r.t to those UEs. The 6g-NB-DU 702 receives IRS proximity indication along with the list of UEs associated with the list of IRSs, reserved IRS resources etc. The 6g-NB-DU 702, after receiving the IRS Proximity Indication message, updates its table with the list of UEs according to the mapping with respective IRSs. The 6g-NB-DU 702 further initiates requesting those UEs (e.g., 718) to send its location information along with the Channel Status Information (CSI). A scheduler module in the 6g-NB-DU 702 starts using the reserved IRS sources for its usage towards specific set of UEs (e.g., 718).

FIG. 7g illustrates an IRS Activation Command procedure 720. This procedure is initiated by the 6g-NB-CU-CP 714 towards 6g-NB-DU 702, to activate or deactivate the IRS. As shown, the 6g-NB-CU-CP 714 sends an IRS activation command [activate/deactivate, validity time, etc.,] to the 6g-NB-DU 702. The 6g-NB-DU 702 initiates the IRS activation/deactivation procedure towards IRS controller as described earlier. The 6g-NB-DU 702 sends IRS activation command accept message to the 6g-NB-CU-CP 714. This procedure predominantly may be used during the energy saving scenarios and also during maintenance scenarios.

In an embodiment, the initial set of procedures to support IRS is performed by 6g-NB-CU-CP using Radio Resource Control (RRC) connection reconfiguration. The RRC connection reconfiguration procedure is used by 6g-NB-CU-CP to configure the measurement control to add a location information of the UE in one or more measurement reports. After receiving this request, the UE starts adding its location information in all subsequent measurement reports. In an alternate embodiment, in line with earlier proximity indication procedures, the UE when it detects it is close to or entering the IRS coverage area, it can start adding the location information either through measurement reports or using proximity indication message.

The present disclosure relates to a system and method to implement Intelligent Reflecting Surfaces (IRS) in 5G and beyond networks. The system may include a network device including one or more processors that may cause the system to establish a network interface protocol with the IRS. In an embodiment, a DU-I interface is established between the network device and the IRS using which various setup procedures can be executed. Using the proposed network interface, the network device may enable setting up of IRS that is available for reflecting signals to one or more UEs in a particular region or area. A mapping of one or more parameters of the IRS to a mechanical or digital tilt for optimal performance is predetermined and stored at the network device. The network device receives one or more measurement reports from the one or more UEs to determine, in run-time, the optimal mechanical or digital tilt based at least in part on the predetermined mapping. The network device sends the optimal mechanical or digital tilt information using the proposed network interface to the IRS and an IRS controller uses the optimal tilt information to re-align its panels or tiles.

Embodiments of a non-transitory computer readable medium (CRM) are disclosed. The CRM includes one or more instructions stored thereupon that when executed by a processor causes the process to perform a set of steps. For example, the execution of the set of instructions causes the processor to compute IRS tilt information associated with the one or more IRSs based at least in part on a first set of information received from the one or more UEs and communicate the computed IRS tilt information to the one or more IRSs via a network interface, wherein the IRS tilt information is used to control one or more operational aspects of the one or more IRSs. In an embodiment, the first set of information includes one or more of signal-to-noise-plus-interference ratio (SINR) information, Reference Signal Received Power (RSRP) information, Reference Signal Received Quality (RSRQ) information, location and channel quality indicator (CQI) information.

Figure 8:
FIG. 8 illustrates an exemplary computer system in which or with which embodiments of the present invention can be utilized in accordance with embodiments of the present disclosure.
Figure 8:
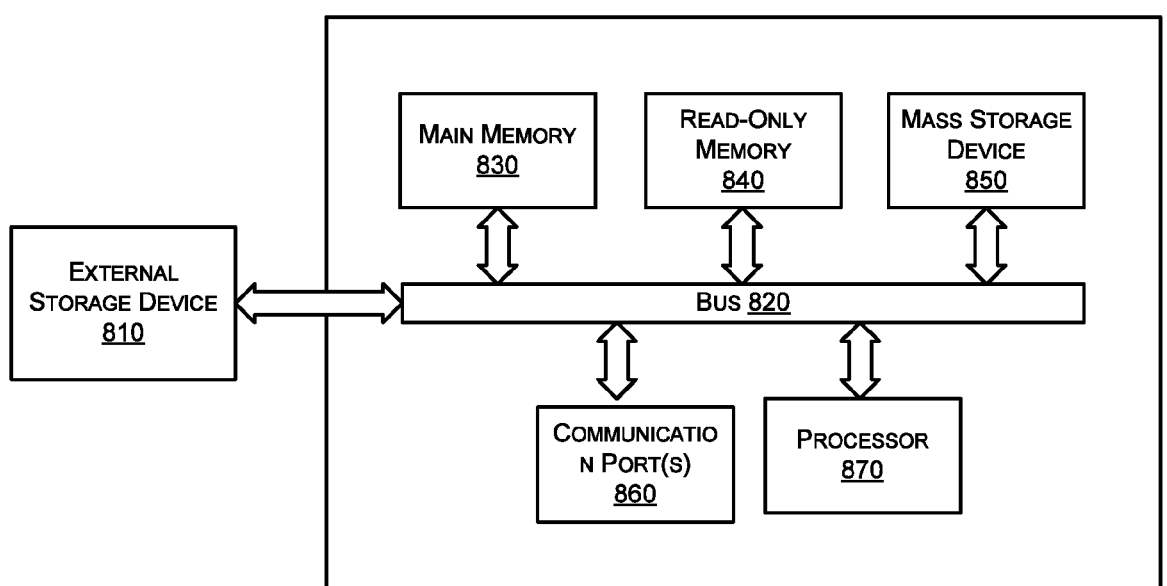

FIG. 8 illustrates an exemplary computer system in which or with which embodiments of the present invention can be utilized in accordance with embodiments of the present disclosure. As shown in FIG. 8, computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 870 may include various modules associated with embodiments of the present invention. Communication port 860 can be any of an RS-232 port for use with a modem based dialup connection, a 10/100 Ethernet port, a Gigabit or 10 Gigabit port using copper or fibre, a serial port, a parallel port, or other existing or future ports. Communication port 860 may be chosen depending on a network, such a Local Area Network (LAN), Wide Area Network (WAN), or any network to which computer system connects. Memory 830 can be Random Access Memory (RAM), or any other dynamic storage device commonly known in the art. Read-only memory 1040 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks (e.g., SATA arrays).

Bus 820 communicatively couples processor(s) 870 with the other memory, storage, and communication blocks. Bus 820 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g., a display, keyboard, and a cursor control device, may also be coupled to bus 820 to support direct operator interaction with a computer system. Other operator and administrative interfaces can be provided through network connections connected through communication port 860. The external storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD- ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides an effective, concurrent, and improved communication within next generation networks (e.g., 6G) by utilizing IRS architectures.

The present disclosure provides a system and a method to eliminate the need for expensive deployment of base stations for improved coverage in areas having one or more obstacles.

The present disclosure provides an economical and next generation based system and method that can avoid problems faced by UEs due to poor signal, signal degradation and lack of coverage.

The present disclosure provides an effective system and method that can enable seamless service quality irrespective of the location of the user.

We claim:

1. A network device in communication with one or more Intelligent Reflecting Surfaces (IRSs) and one or more User Equipments (UEs), the network device comprising:
    one or more processors coupled to a memory storing a set of instructions which when executed by the one or more processors cause the network device to:
    compute IRS tilt information associated with the one or more IRSs based at least in part on a first set of information received from the one or more UEs;
    communicate the computed IRS tilt information to the one or more IRSs via a network interface, wherein the IRS tilt information is used to control one or more operational aspects of the one or more IRSs;
    receive a handshake signal from a new IRS when activated via a physical connection between the new IRS and the network device during a setup process; and
    create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details.

2. The network device as claimed in claim 1, wherein the one or more processors further cause the network device to compute the IRS tilt information based on one or more of location of the one or more IRSs, location of the one or more UEs, and channel quality indicator (CQI) information from the one or more UEs, wherein the IRS tilt information is indicative of beam forming for the one or more IRSs.

3. The network device as claimed in claim 1, wherein the one or more processors further cause the network device to compute the IRS tilt information as a precoding matrix or a beam forming or an IRS tilt matrix that is used to transmit one or multiple spatially directive signals simultaneously from each of the one or more IRSs, wherein each of the one or more IRSs comprises of a plurality of antennas.

4. The network device as claimed in claim 3, wherein every antenna of the one or more IRS transmit array is configured to emit a different signal, designed in digital domain based on the respective IRS tilt information.

5. The network device as claimed in claim 3, wherein the one or more IRSs apply the precoding matrix or the beam forming matrix provided by the network device to provide directivity towards an intended UE of the one or more UEs and choose a corresponding transmit power.

6. The network device as claimed in claim 3, wherein the one or more IRSs uses the IRS tilt information to compute a digital tilt and a mechanical tilt for each of the antennas and to allocate power and phases to each of the antennas.

7. The network device as claimed in claim 1, wherein the one or more processors further cause the network device to be aware of the one or more IRSs either through prior knowledge encoded in a database or via a signalling mechanism established between the one or more IRSs and the network device via the network interface.

8. The network device as claimed in claim 1, wherein the network interface implements a network interface protocol that is established between the network device and the one or more IRSs, wherein the network interface protocol includes a handshake signal schema.

9. The network device as claimed in claim 1, wherein the network interface is established through a direct connection between the network device and the one or more IRSs via a micro controller.

10. The network device as claimed in claim 1, wherein the one or more processors further cause the network device to compute the IRS tilt information necessary to achieve a SINR objective based on one or more of a user distribution, user profiles, SINR profiles, and Block Error Rate (BLER) profiles for a given region serviced by the network device.

11. The network device as claimed in claim 1, wherein the one or more processors further cause the network device to send one or more control messages to the one or more IRSs at a pre-configured periodicity, wherein the one or more IRSs are controlled by the network device using the one or more control messages.

12. The network device as claimed in claim 1, wherein the first set of information comprises one or more of signal-to-noise-plus-interference ratio (SINR) information, Reference Signal Received Power (RSRP) information, and Reference Signal Received Quality (RSRQ) information received from the one or more UEs.

13. A method implemented in a network device in communication with one or more Intelligent Reflecting Surfaces (IRSs) and one or more User Equipments (UEs), the method comprising:

computing IRS tilt information associated with the one or more IRSs based at least in part on a first set of information received from the one or more UEs;

communicating the computed IRS tilt information to the one or more IRSs via a network interface, wherein the IRS tilt information is used to control one or more operational aspects of the one or more IRSs;

receiving a handshake signal from a new IRS when activated via a physical connection between the new IRS and the network device during a setup process; and creating an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details.

14. A User Equipment (UE) comprising:

one or more processors coupled to a memory storing a set of instructions which when executed by the one or more processors cause a network device to:

transmit a first set of information associated with the UE to one or more 6G network devices, wherein the one or more 6G network devices are configured to:

compute Intelligent Reflecting Surface (IRS) tilt information associated with one or more IRSs based at least in part on the first set of information received from the one or more UESs;

communicate the computed IRS tilt information to the one or more IRSs via a network interface, wherein the IRS tilt information is used to control one or more operational aspects of the one or more IRSs to provide network services to the UE;

receive a handshake signal from a new IRS when activated via a physical connection between the new IRS and the network device during a setup process; and create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details.

15. The UE as claimed in claim 14, wherein the first set of information comprises one or more of signal-to-noise-plus-interference ratio (SINR) information, Reference Signal Received Power (RSRP) information, Reference Signal Received Quality (RSRQ) information, location and channel quality indicator (CQI) information.

16. A non-transitory computer readable medium (CRM) that comprises one or more instructions stored thereupon that when executed by a processor causes the process processor to:

compute Intelligent Reflecting Surface (IRS) tilt information associated with the one or more IRSs based at least in part on a first set of information received from the one or more User Equipments (UEs);

communicate the computed IRS tilt information to the one or more IRSs via a network interface, wherein the IRS tilt information is used to control one or more operational aspects of the one or more IRSs;

receive a handshake signal from a new IRS when activated via a physical connection between the new IRS and the network device during a setup process; and create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details.

17. The CRM as claimed in claim 16, wherein the first set of information comprises one or more of signal-to-noise-plus-interference ratio (SINR) information, Reference Signal Received Power (RSRP) information, Reference Signal Received Quality (RSRQ) information, location and channel quality indicator (CQI) information.

* * * * *